(12) United States Patent
Montalban

(10) Patent No.: US 10,795,179 B2
(45) Date of Patent: Oct. 6, 2020

(54) ELASTIC HINGE FOR EYEGLASS FRAMES

(71) Applicant: VISOTTICA INDUSTRIE S.p.A., Susegana (IT)

(72) Inventor: Rinaldo Montalban, Venice (IT)

(73) Assignee: VISCOTTICA INDUSTRIE S.p.A., Susegana (IT)

( * ) Notice: Subject to any disclaimer, the term of this patent is extended or adjusted under 35 U.S.C. 154(b) by 169 days.

(21) Appl. No.: 16/202,133

(22) Filed: Nov. 28, 2018

(65) Prior Publication Data

US 2019/0162983 A1 May 30, 2019

(30) Foreign Application Priority Data

Nov. 28, 2017 (IT) .................. 102017000136874

(51) Int. Cl.
    *G02C 5/22* (2006.01)

(52) U.S. Cl.
    CPC ......... *G02C 5/2227* (2013.01); *G02C 5/2236* (2013.01); *G02C 5/2281* (2013.01); *G02C 2200/04* (2013.01); *G02C 2200/26* (2013.01); *G02C 2200/30* (2013.01)

(58) Field of Classification Search
    CPC ............... G02C 5/2263; G02C 5/2236; G02C 2200/26; G02C 5/2227; G02C 2200/24; G02C 5/2245; G02C 5/2254; G02C 2200/22; G02C 5/22; G02C 5/2218; G02C 5/2281; G02C 9/02
    USPC ............................ 351/153, 121, 111; 16/228
See application file for complete search history.

(56) References Cited

U.S. PATENT DOCUMENTS

| | | | |
|---|---|---|---|
| 4,145,124 A | 3/1979 | Weisgerber | |
| 7,010,831 B1 | 3/2006 | Beck et al. | |
| 2008/0266518 A1* | 10/2008 | Niu | G02C 5/2236 351/153 |
| 2016/0377883 A1 | 12/2016 | Montalban | |
| 2017/0139229 A1 | 5/2017 | Montalban | |

FOREIGN PATENT DOCUMENTS

| | | |
|---|---|---|
| DE | 19604917 | 6/1997 |
| EP | 1326124 | 7/2003 |
| WO | 2005001551 | 1/2005 |

* cited by examiner

*Primary Examiner* — Hung X Dang
(74) *Attorney, Agent, or Firm* — Mark M. Friedman

(57) ABSTRACT

Elastic hinge for eyeglass frames, which comprises an articulation screw engaged in the holes of two articulation elements. The articulation screw comprises a shank provided with a narrow portion, which is engaged in the hole of a first tab of an articulation element, and with an enlarged annular portion, which forms a step and is engaged in the hole of a head portion of the other articulation element. The articulation screw assumes an end stop position, in which it is tightened and aligned with the hinging axis, and a blocking position, in which it is loosened and is tilted with respect to the hinging axis in response to the elastic force exerted by an elastic device, such that the step of the articulation screw interferes with the edge of the hole of the first tab of the articulation element, preventing a further unscrewing of the articulation screw.

7 Claims, 22 Drawing Sheets

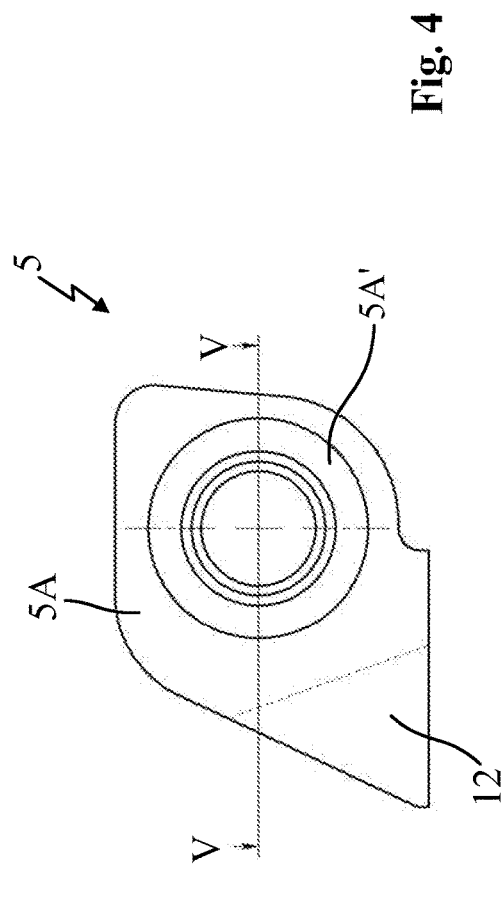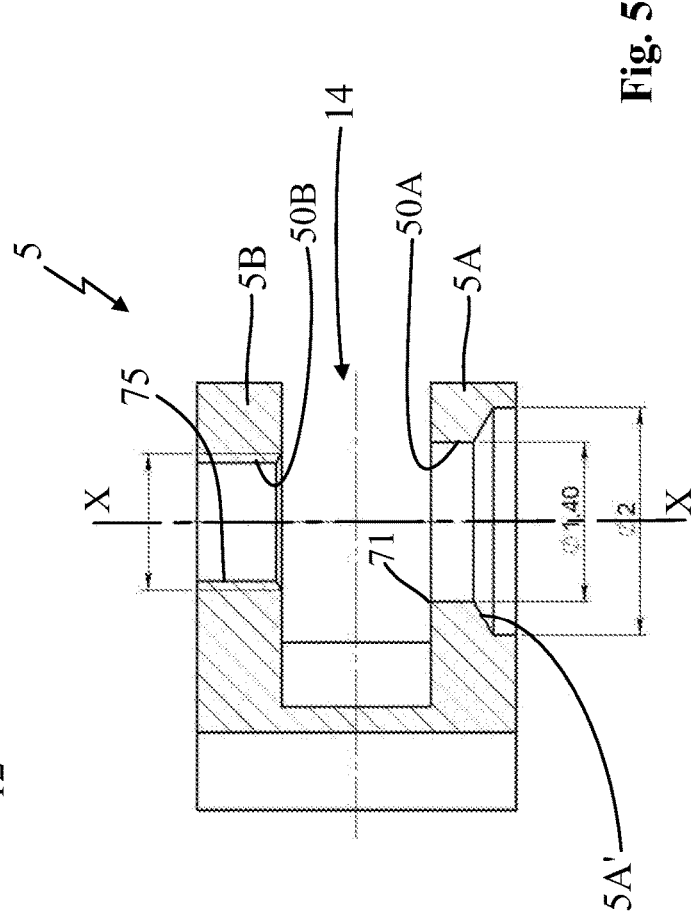

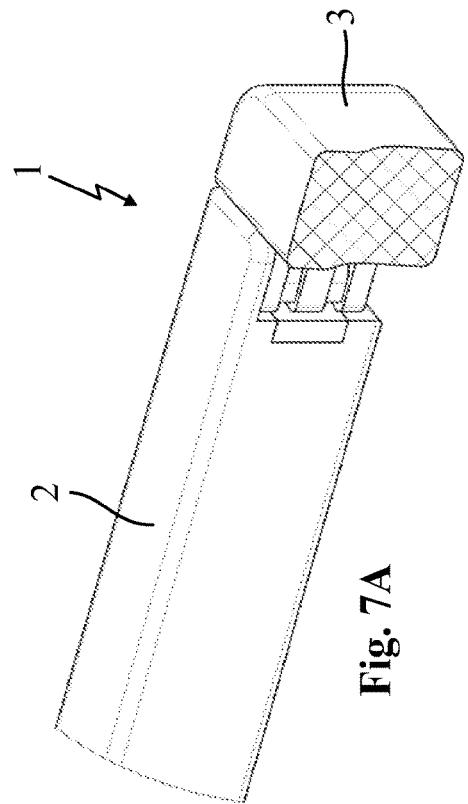
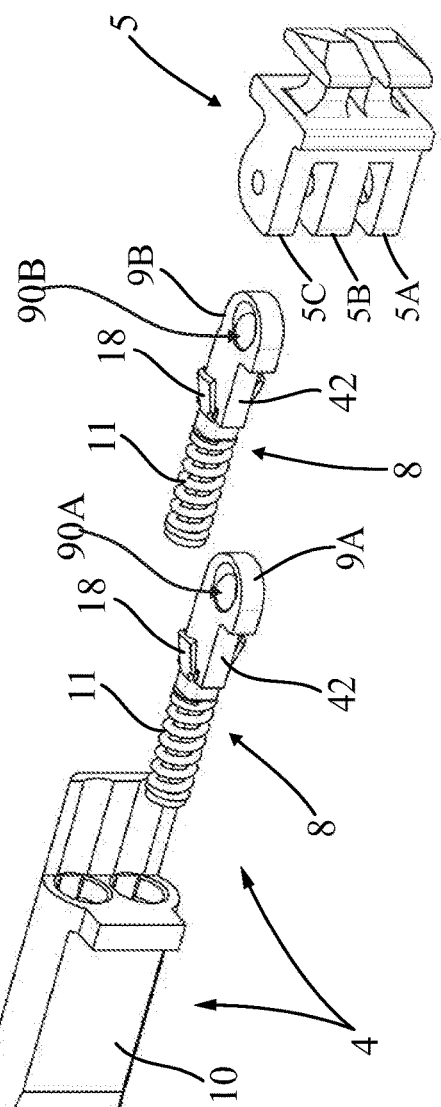
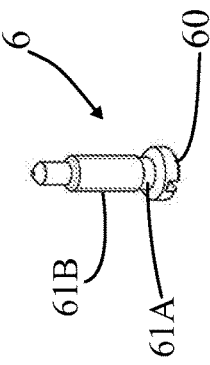
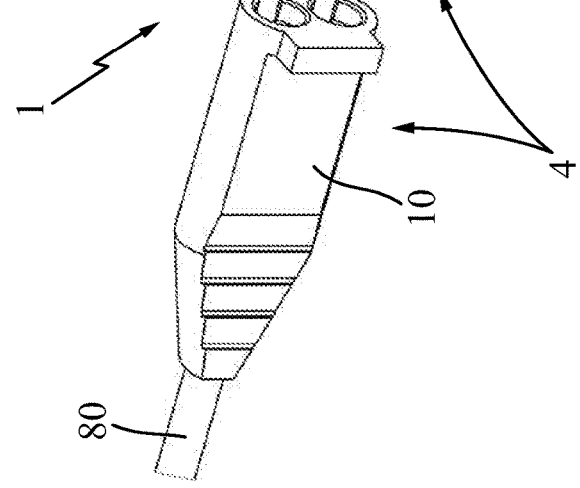
Fig. 7A
Fig. 7B

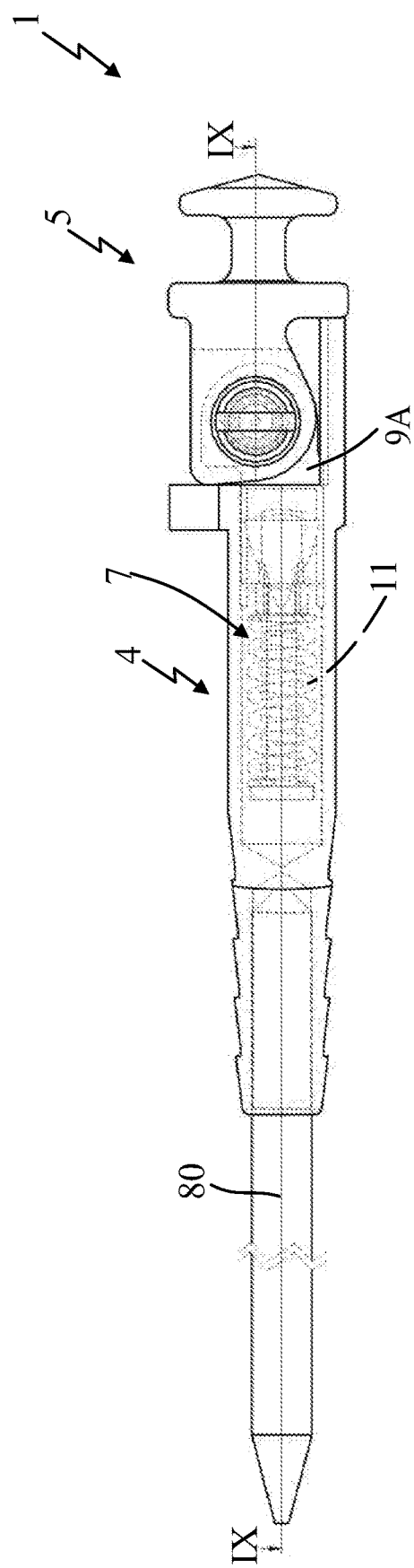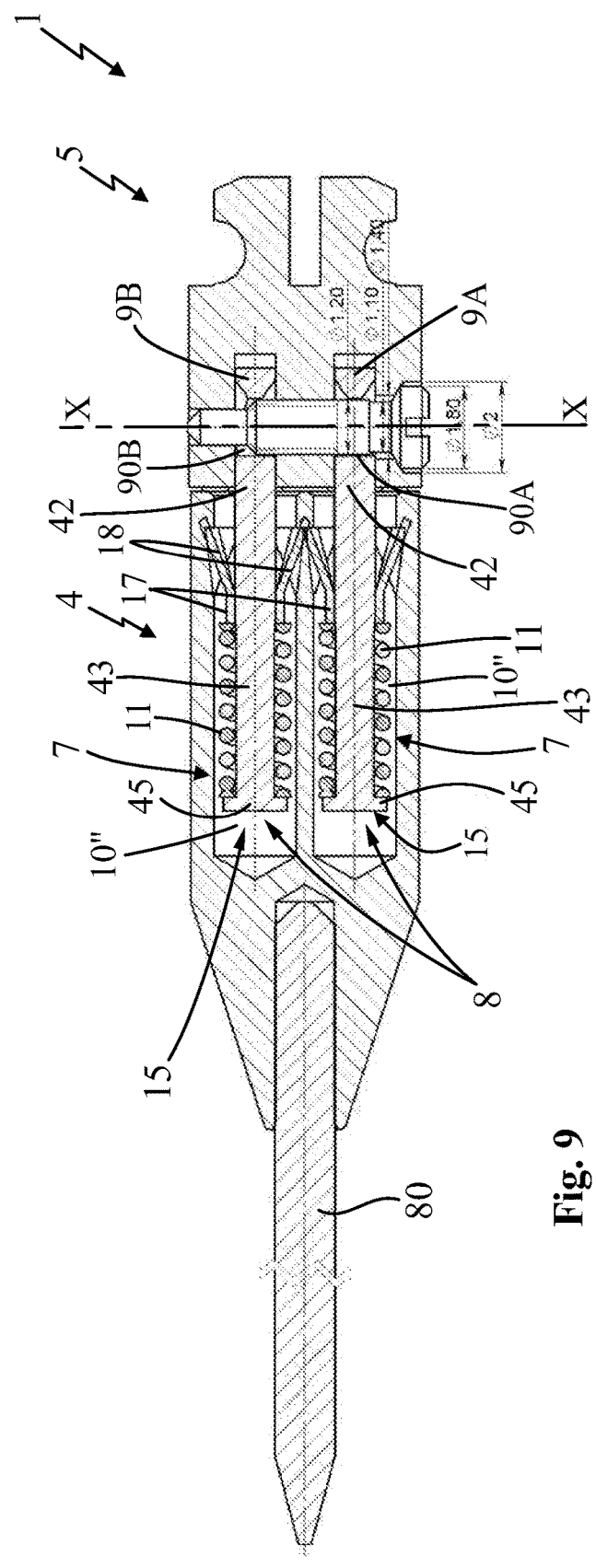
Fig. 8
Fig. 9

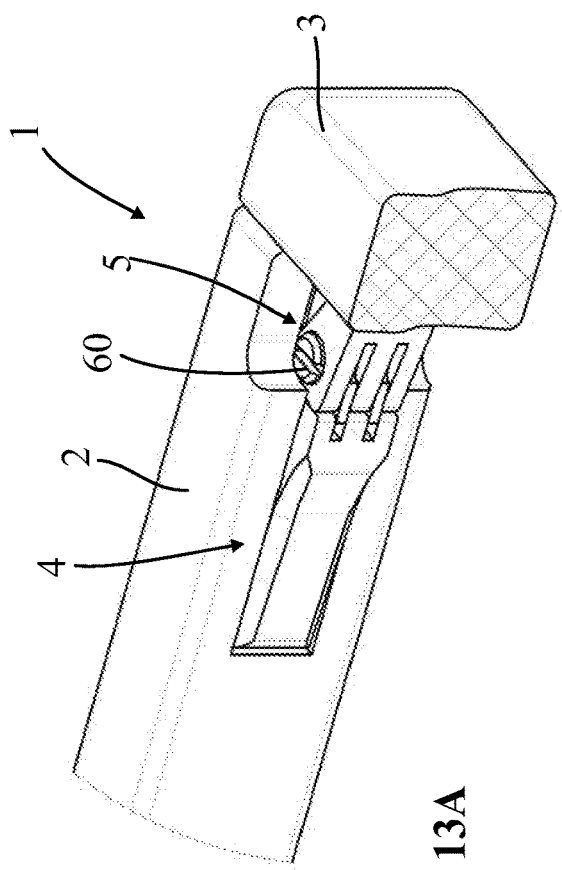
Fig. 13A
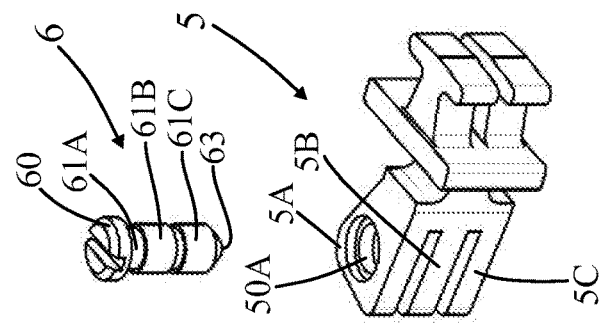
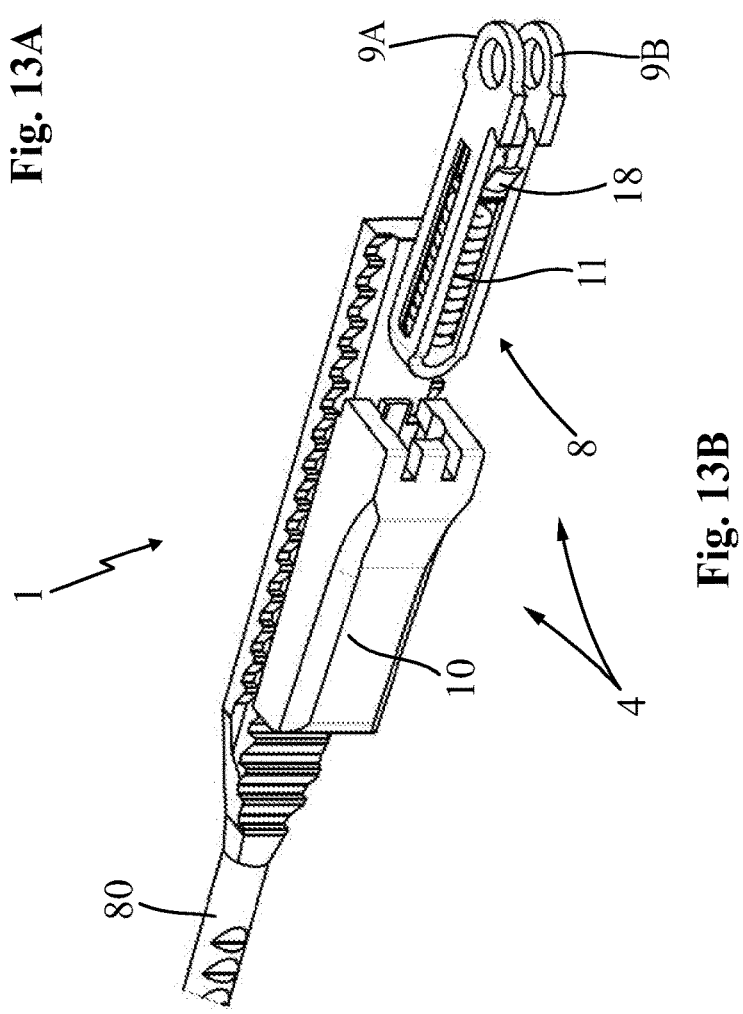
Fig. 13B

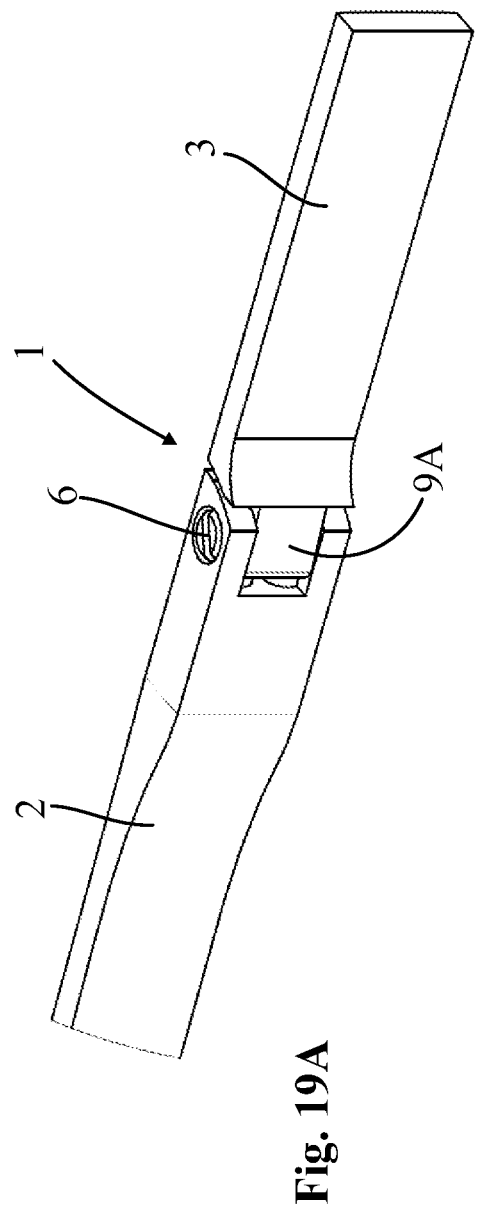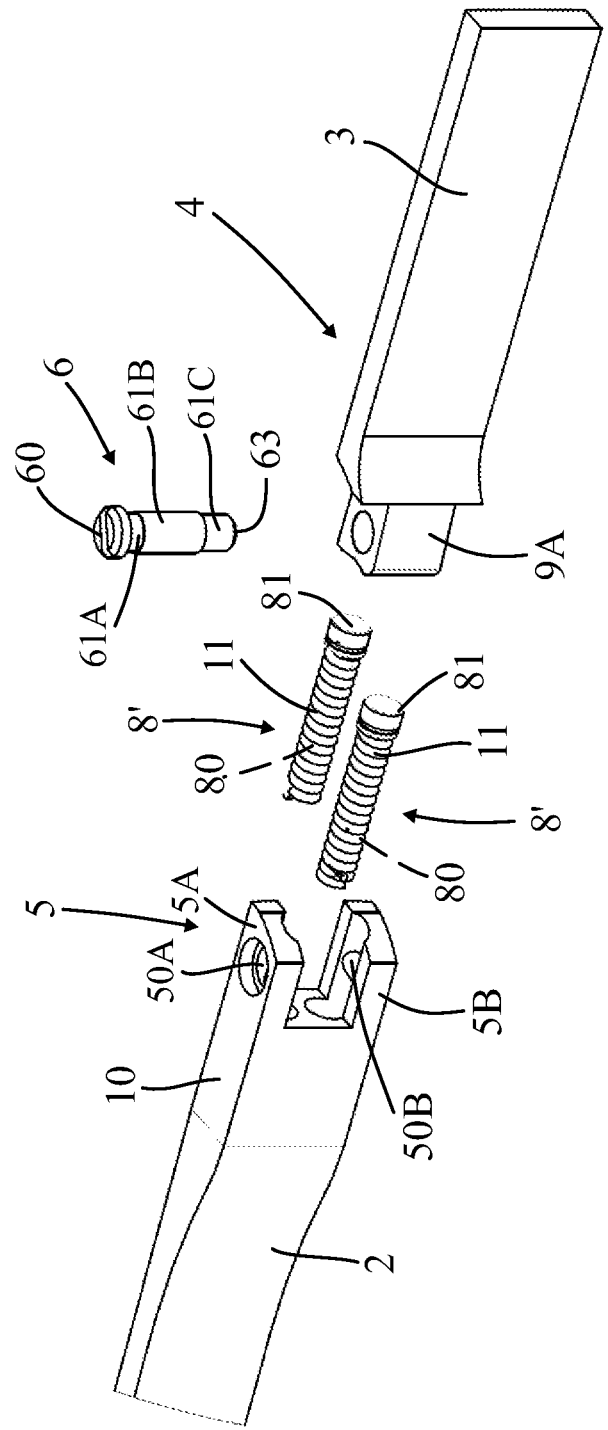
Fig. 19A
Fig. 19B

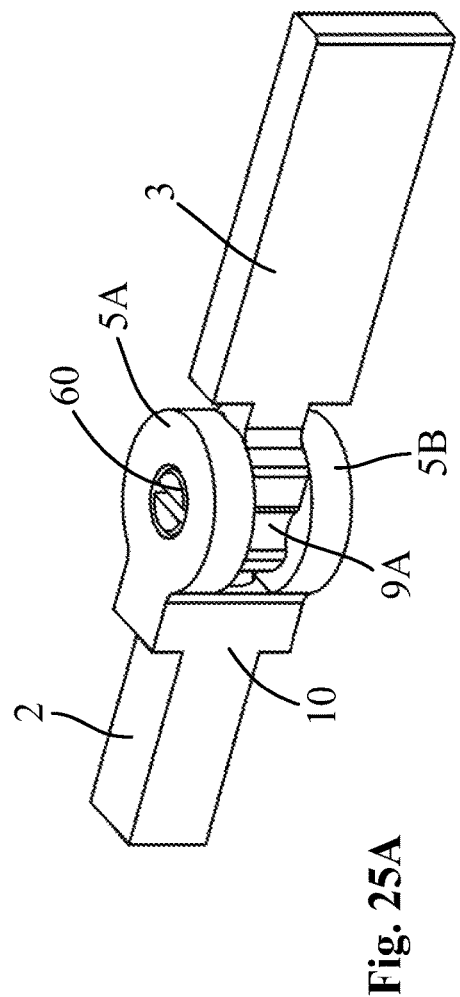
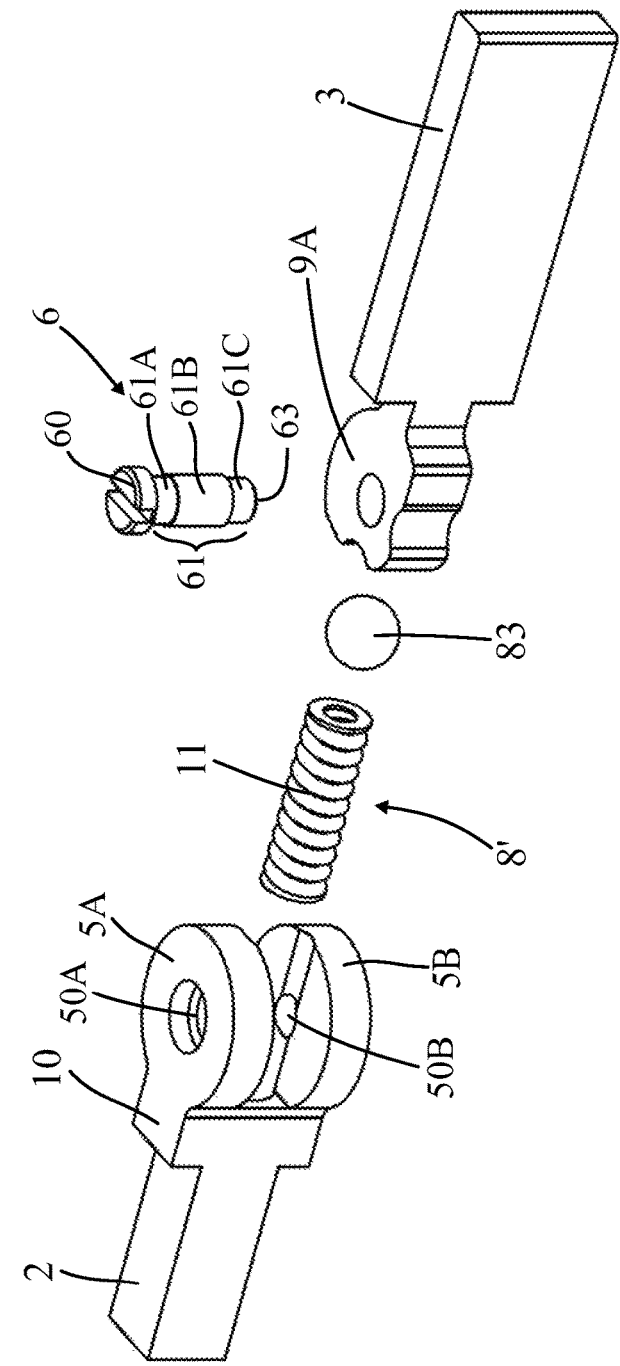
Fig. 25A
Fig. 25B

ELASTIC HINGE FOR EYEGLASS FRAMES

FIELD OF APPLICATION

The present invention regards an elastic hinge for eyeglass frames.

The present elastic hinge is intended to be advantageously employed in the production of eyeglass frames, both made of plastic and metal, of any type and in particular both for sunglasses and for eyeglasses.

Therefore, the hinge, object of the present invention, is inserted in the industrial field of eyeglasses, i.e. of production of eyeglasses and of accessories and components for eyeglasses.

STATE OF THE ART

Conventionally, in the field of the eyeglasses, the hinges are employed for articulating the temples to the front of a frame.

Each hinge is usually formed by two articulation elements, pivoted together, of which respectively a first element is fixed to a temple and a second element is fixed to a lateral portion of the front of the frame (also known, in the technical jargon of the field, with the term "end piece").

In operation, the hinges allow the temples to rotate between a closed position, in which they are collected on the front of the eyeglasses, and an open position, in which they assume a substantially right-angle position with respect to the front adapted to allow the use thereof on the face of the user.

In particular, the present invention refers to so-called "elastic" hinges, i.e. to hinges that allow moving the temples between the aforesaid positions by overcoming an opposing force exerted by an elastic device associated with the hinge.

The elastic device allows numerous advantages, including that of allowing the user to more easily put on the eyeglasses, since the temples can be moved for an over-travel beyond the aforesaid open position in order to then be released, once the eyeglasses are worn, on the head of the user, exerting a slight pressure thereon. Such pressure allows the temples to be maintained always adherent to the head of the user, ensuring an optimal stability of the eyeglasses in different use conditions.

The elastic device also allows maintaining the temples collected behind the front in a stable closure condition.

The elastic device is usually housed within a corresponding elongated containment structure, fixed to the temple along the longitudinal extension axis thereof and it can take on various embodiments. For example, the elastic device can comprise one or more slidable carriages associated with at least one spring, drawn towards the interior of the containment body, or one or more pistons or spheres elastically pushed by a spring against the cam-shaped profiles of a male hinge element.

The containment structures are obtained directly on the temple or made on a dedicated box-like body fixed to the temple. The first articulation elements associated with the elastic mechanisms are pivoted by means of a hinge screw to the second articulation elements fixed to the end piece. For such purpose, the screw is engaged in aligned holes of the two articulation elements.

In order to exert this suitable pressure on the temples of the user, it is necessary that the spring of the elastic device be suitably pre-compressed already during the carriage assembly step. In addition, it is almost always necessary that the spring of the elastic device be further subjected to an additional preloading that provides a certain non-alignment between the holes of the two articulation elements.

The spring of the elastic device is therefore always able, during the use of the eyeglasses, to exert a traction or a thrust against a head portion of a male articulation element.

The normal lifetime of a hinge therefore consists of operations of opening, closing of the temples and, in the current case of "flex" elastic hinges, also of operations of opening with an extra-opening travel of the temples. Such operations are also repeated many times per day and over a number of years in the normal use of eyeglasses.

Therefore, during the normal life cycle of eyeglasses, which on average can be considered about 5-10 years, a hinge must statistically complete between 25,000 and 50,000 cycles following opening/closing operations of the temple.

The repetition of such temple opening/closing cycles leads—due to the friction between the thread of the articulation screw and the nut screw in which it is engaged, as well as due to the working tolerances that necessarily require clearances for inserting and screwing the articulation screws in the nut screws—to the undesired phenomenon first of loosening and then of complete unscrewing of the articulation screws, up to reaching the complete unscrewing of the articulation screws and the complete outward exit from the hinge.

In order to resolve such drawback, it is known to use articulation screws, so-called Teflon-coated screws, i.e. whose crests of the threads are coated with a deposit of a nylon layer which, during the screwing of the screw in the nut screw, comes to fill the cavities between the threads of the screw and of the nut screw, increasing the friction and in substance preventing the unscrewing.

Such solution has nevertheless proven that it is not always usable, since it involves an increase of the production costs in particular of the articulation screws.

In order to overcome this drawback, it is known from patent EP 1326124 to use an elastic hinge formed by two articulation elements. One articulation element is of male type and is provided with an elastic carriage provided with a head projecting from a containment body and provided with a first hole. The other articulation element is of female type and is provided with two tabs correspondingly having a second and a third hole. A shaped hinge pin is then provided, which is inserted in the aforesaid holes in order to rotatably connect the two articulation elements.

More in detail, the hinge pin comprises two enlarged heads fixed to the ends of a thinned shank, which is thus interposed between the two heads, with which it defines a central annular seat. The two heads are inserted in the holes of the two tabs of the female articulation element while the shank is inserted in the first hole of the head of the carriage of the male articulation element.

The elastic carriage acts as a tie rod on the hinge pin and, through its first hole, it is engaged in the annular seat defined by the thinned shank of the articulation pin, exerting an elastic traction force thereon.

The engagement of the head of the carriage in such annular seat, ensured by the elasticity of the spring exerted on the carriage, prevents the hinge pin from carrying out axial displacements and hence from exiting from the holes of the two articulation elements.

Advantageously, the first hole of the head of the carriage provides for a non-aligned portion with shape corresponding to that of the shank in order to allow a shape coupling with the latter and simultaneously allow, during mounting, the easy through insertion of a head of the hinge pin up to reaching a hole of a tab of the female articulation.

Such solution thus does not provide for a screwing hinge pin—but even if one wishes to make a threaded portion on such hinge pin, such pin would be poorly adapted to be used in hinges provided with screw centering systems in which the elastic carriage must be drawn after the screw has engaged a tab of a female articulation provided on the front of the eyeglass frame, as is for example described in the United States patent applications US 20170139229 and US 20160377883 in the name of the same Applicant. In addition, a further drawback of this solution lies in the fact that the pin is mechanically weakened by the presence of the annular groove necessary for confining the eyelet of the tie rod at its interior.

Finally, known from the patent WO 2005001551A is an elastic hinge very similar to that described in the patent EP 1326124 in which the hinge pin comprises a cavity that is not annular, but rather is eccentric. Should the pin rotate in order to be loosened and unscrewed, there would thus be an increase of the tensioning force of the tie rod, which would lead to opposing a further unscrewing of the articulation screw.

Also this hinge embodiment has the same drawbacks as that described in the patent EP 1326124 and mentioned above.

Hence, the elastic hinges present on the market today have the drawback of not being able to securely retain the articulation screw in the holes of the hinge articulation elements with limited costs, or they are able to do so to the detriment of decreasing the mechanical strength of the screw or with shapes of the screw that do not allow a versatile use for all hinge types.

PRESENTATION OF THE INVENTION

In this situation, the problem underlying the present invention is to eliminate the drawbacks of the abovementioned prior art, by providing an elastic hinge for eyeglass frames whose articulation screw is firmly constrained to the hinge even after numerous opening and closing cycles, i.e. for the entire lifetime of the eyeglasses on which it is mounted.

A further object of the present finding is to provide an elastic hinge for eyeglass frames which is mechanically strong.

A further object of the present finding is to provide an elastic hinge for eyeglass frames which is easy to mount.

A further object of the present finding is to provide an elastic hinge for eyeglass frames which is entirely reliable in operation.

A further object of the present finding is to provide an elastic hinge for eyeglass frames which is inexpensive to make.

BRIEF DESCRIPTION OF THE DRAWINGS

The technical characteristics of the finding, according to the aforesaid objects, and the advantages thereof will be clearer from the following detailed description, made with reference to the enclosed drawings, which represent several merely exemplifying and non-limiting embodiments of the invention, in which:

FIG. 4 shows a detail of the hinge of FIG. 1, according to the present invention, relative to a second female articulation element;

FIG. 5 shows a section view of the detail of the hinge of FIG. 4, according to the present invention, made along the trace V-V of FIG. 4;

FIGS. 7A and 7B show a perspective view of a second embodiment of the elastic hinge for eyeglass frames according to the present invention, respectively illustrated assembled and exploded; the hinge is mounted to connect a temple and an end piece of the eyeglass frame, with the temple and the end piece only partly illustrated and with the temple in open position;

FIG. 8 shows a side view of only the hinge of FIG. 7, according to the present invention;

FIG. 9 shows a section view of the hinge of FIG. 7, according to the present invention, made along the trace IX-IX of FIG. 8;

FIGS. 13A and 13B show a perspective view of a third embodiment of the elastic hinge for eyeglass frames according to the present invention, respectively illustrated assembled and exploded; the hinge is mounted to connect a temple and an end piece of the eyeglass frame, with the temple and the end piece only partly illustrated and with the temple in open position;

FIGS. 19A and 19B show a perspective view of a fourth embodiment of the elastic hinge for eyeglass frames according to the present invention, respectively illustrated assembled and exploded; the hinge is mounted to connect a temple and an end piece of the eyeglass frame, with the temple and the end piece only partly illustrated and with the temple in open position;

FIGS. 25A and 25B show a perspective view of a fifth embodiment of the elastic hinge for eyeglass frames according to the present invention, respectively illustrated assembled and exploded; the hinge is mounted to connect a temple and an end piece of the eyeglass frame, with the temple and the end piece only partly illustrated and with the temple in open position;

DETAILED DESCRIPTION OF A PREFERRED EMBODIMENT

Figure 1:
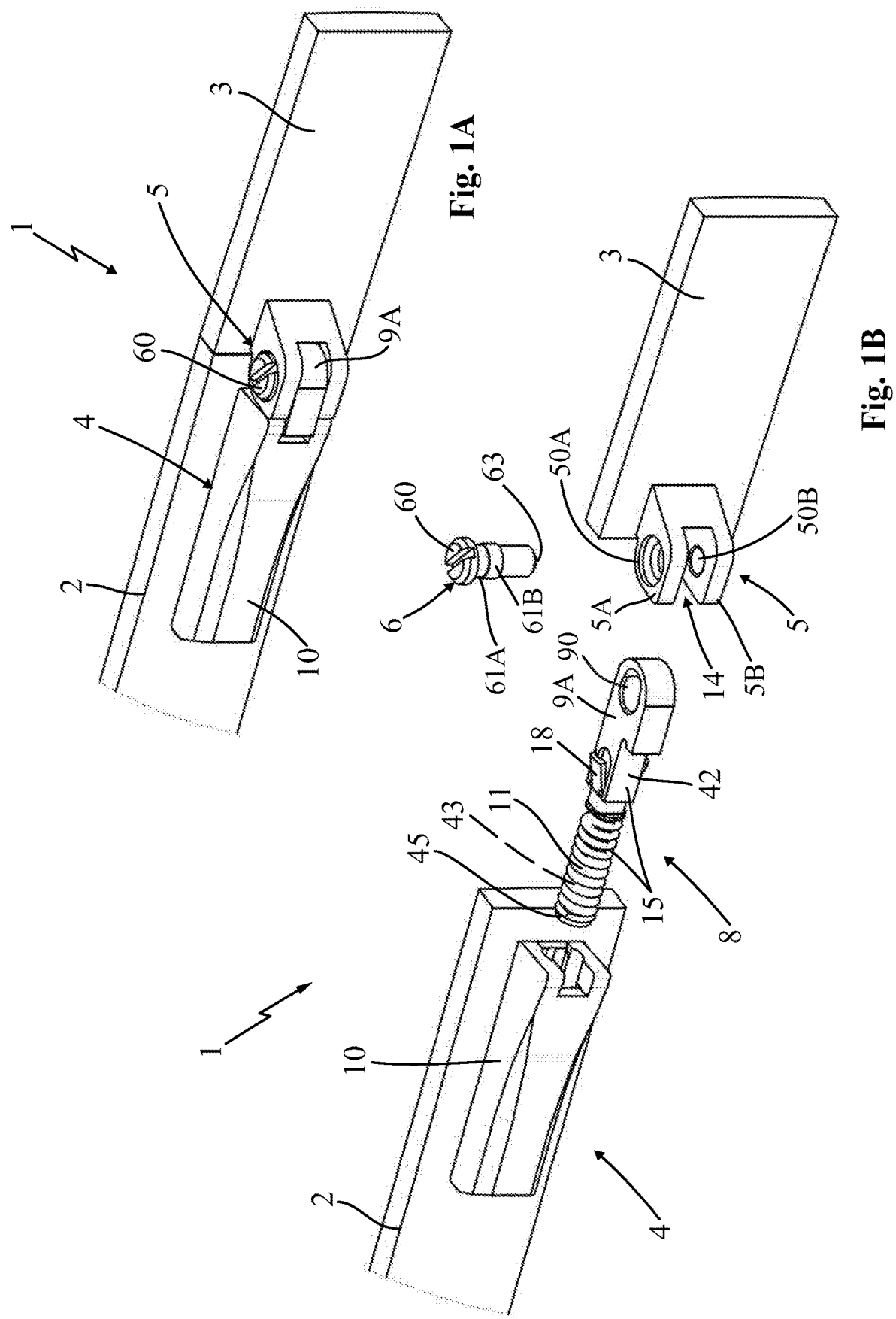
FIGS. 1A and 1B show a perspective view of a first embodiment of the elastic hinge for eyeglass frames according to the present invention, respectively illustrated assembled and exploded; the hinge is mounted to connect a temple and an end piece of the eyeglass frame, with the temple and the end piece only partly illustrated, and with the temple in open position.
Figure 2:
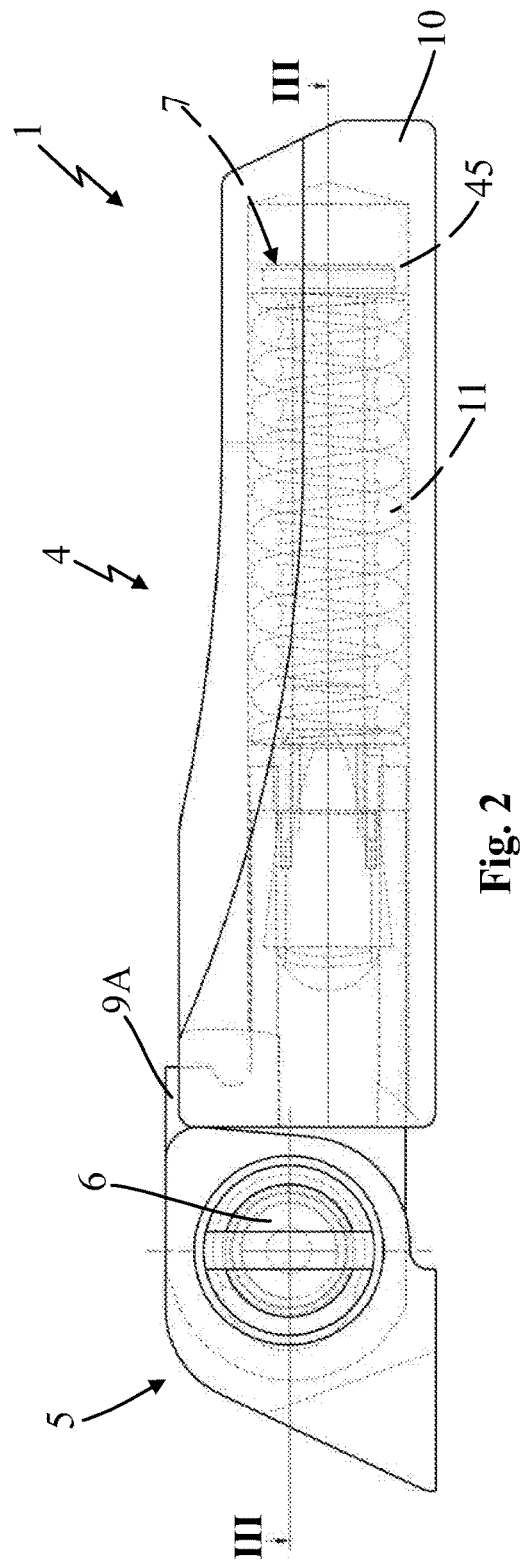
FIG. 2 shows a side view of only the hinge of FIG. 1, according to the present invention.
Figure 3:
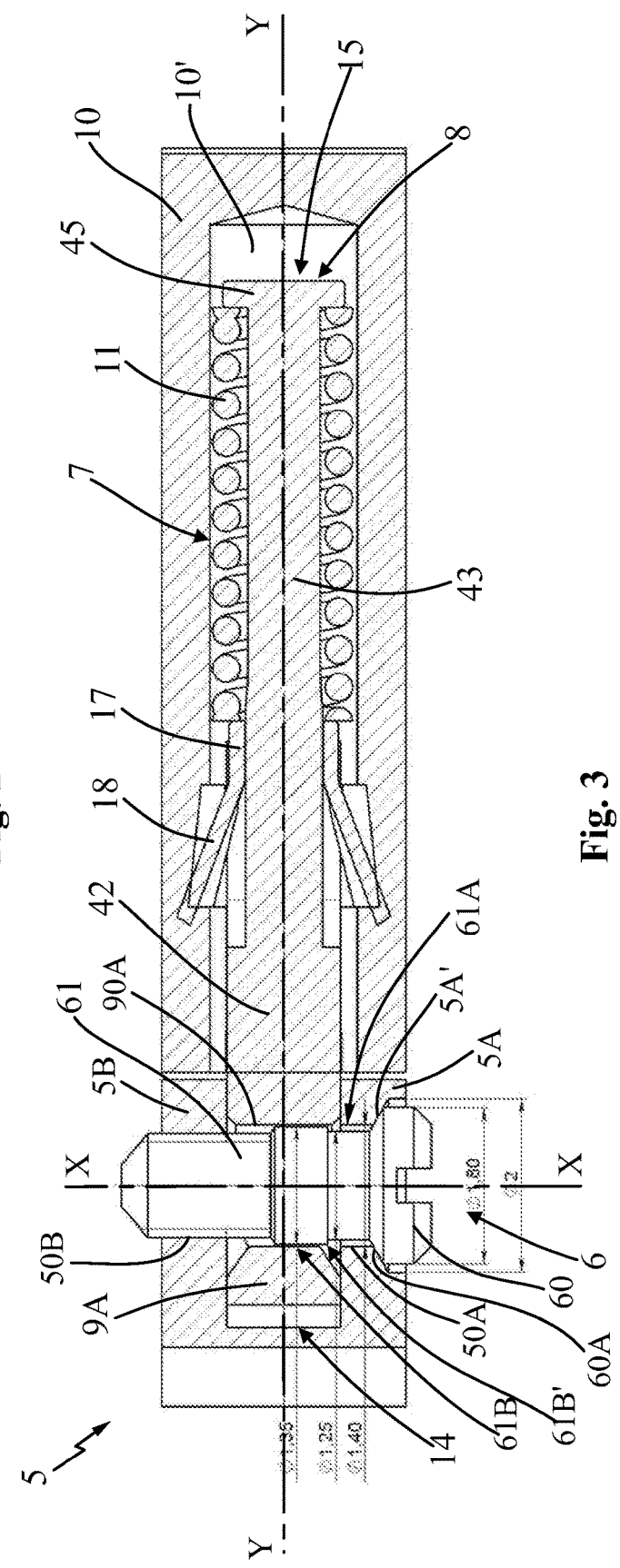
FIG. 3 shows a section view of the hinge of FIG. 1, according to the present invention, made along the trace III-III of FIG. 2.
Figure 6:
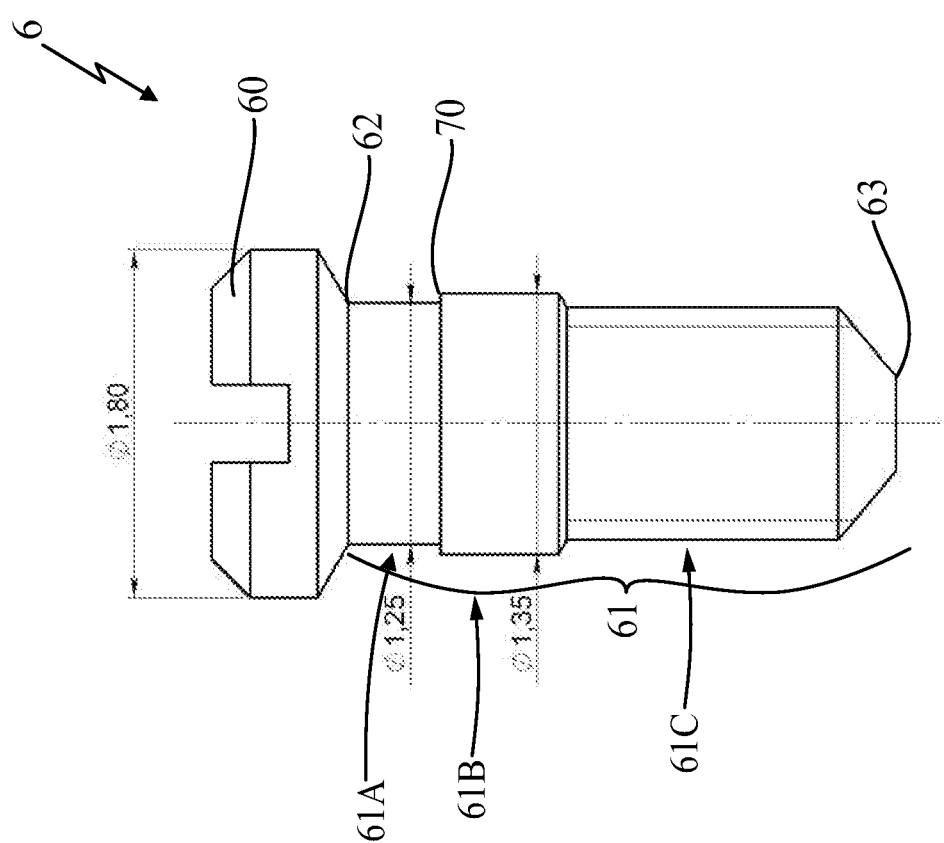
FIG. 6 shows a detail of the hinge of FIG. 1, according to the present invention, relative to an articulation screw.
Figure 10:
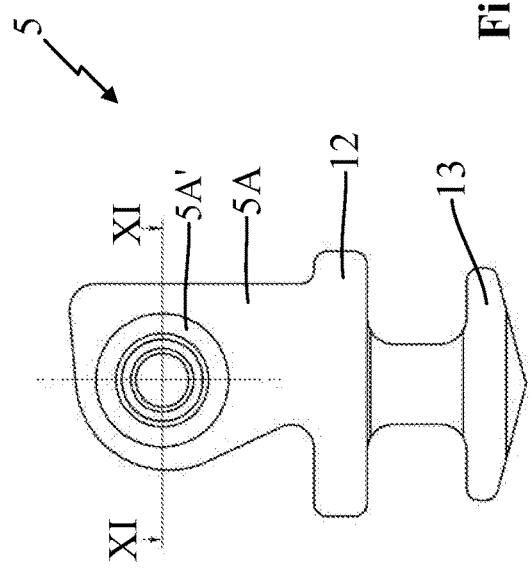
FIG. 10 shows a detail of the hinge of FIG. 7, according to the present invention, relative to a second female articulation element.
Figure 11:
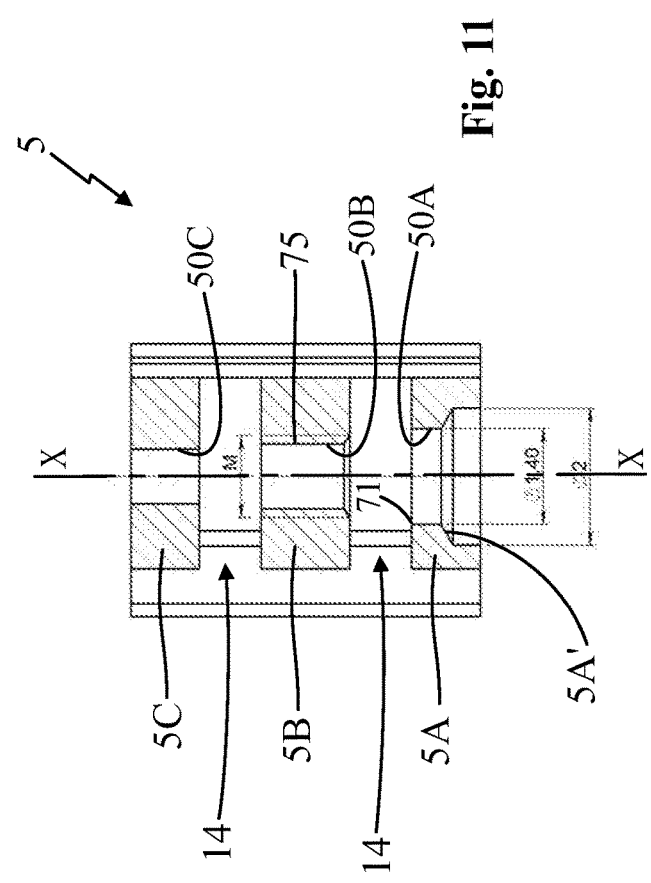
FIG. 11 shows a section view of the detail of the hinge of FIG. 10, according to the present invention, made along the trace XI-XI of FIG. 10.
Figure 12:
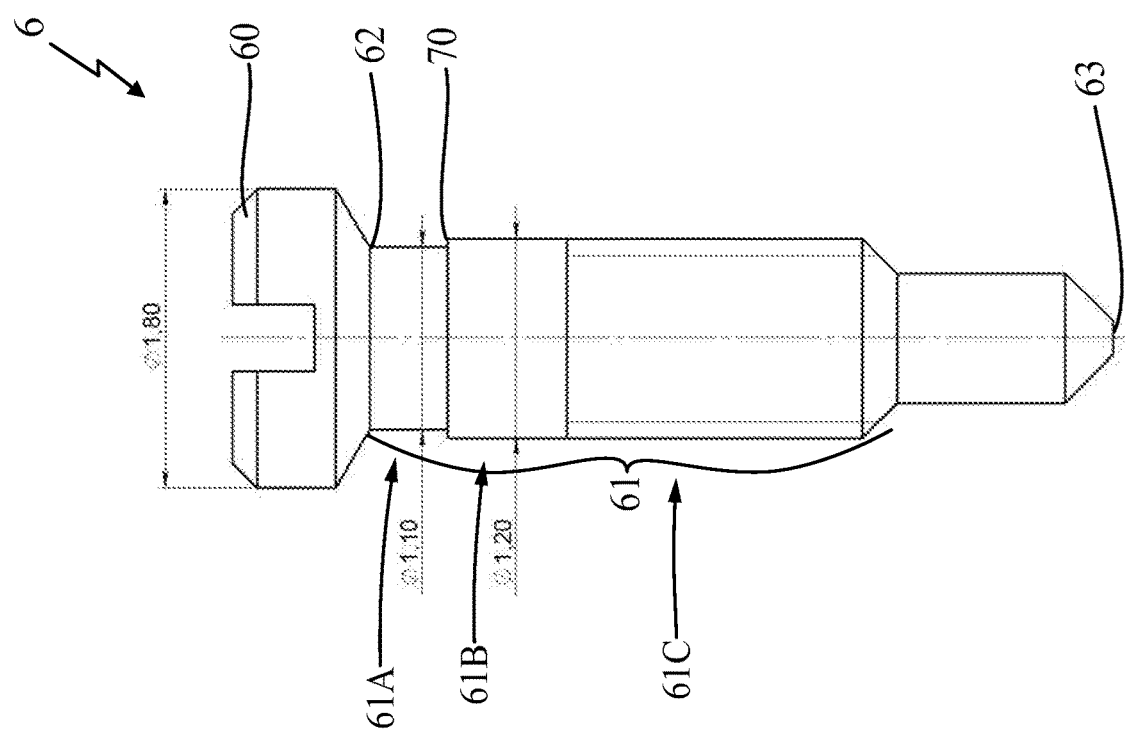
FIG. 12 shows a detail of the hinge of FIG. 7, according to the present invention, relative to an articulation screw.
Figure 14:
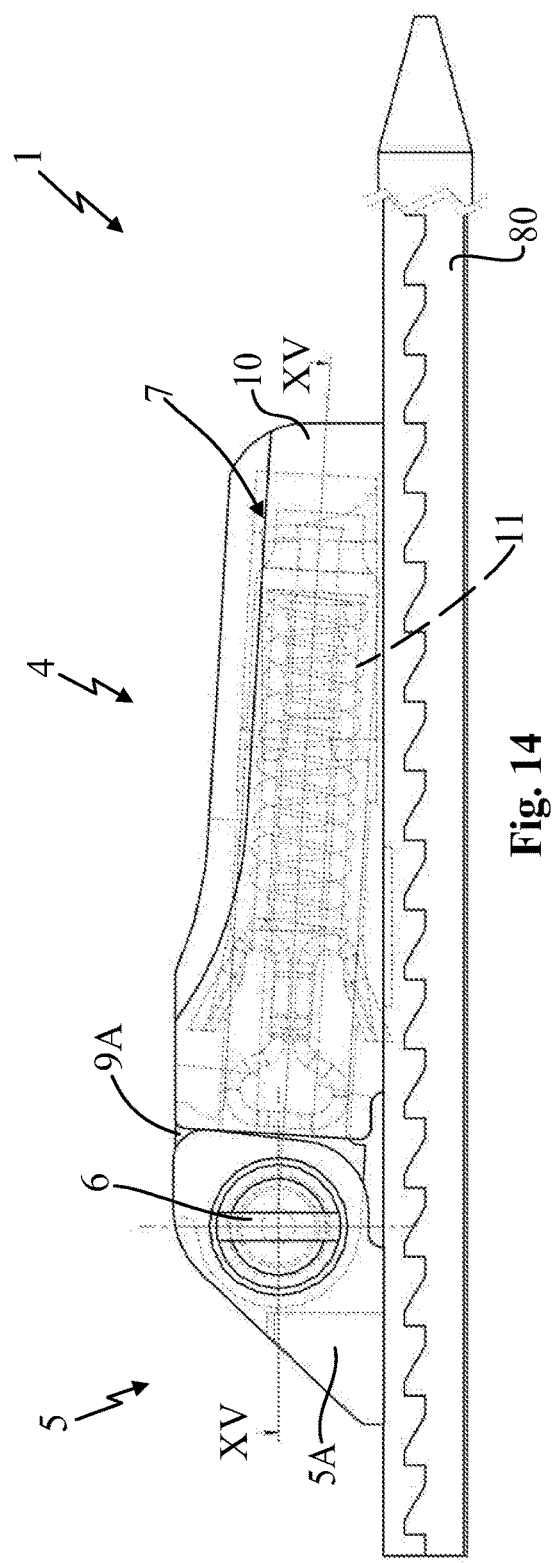
FIG. 14 shows a side view of only the hinge of FIG. 13, according to the present invention.
Figure 15:
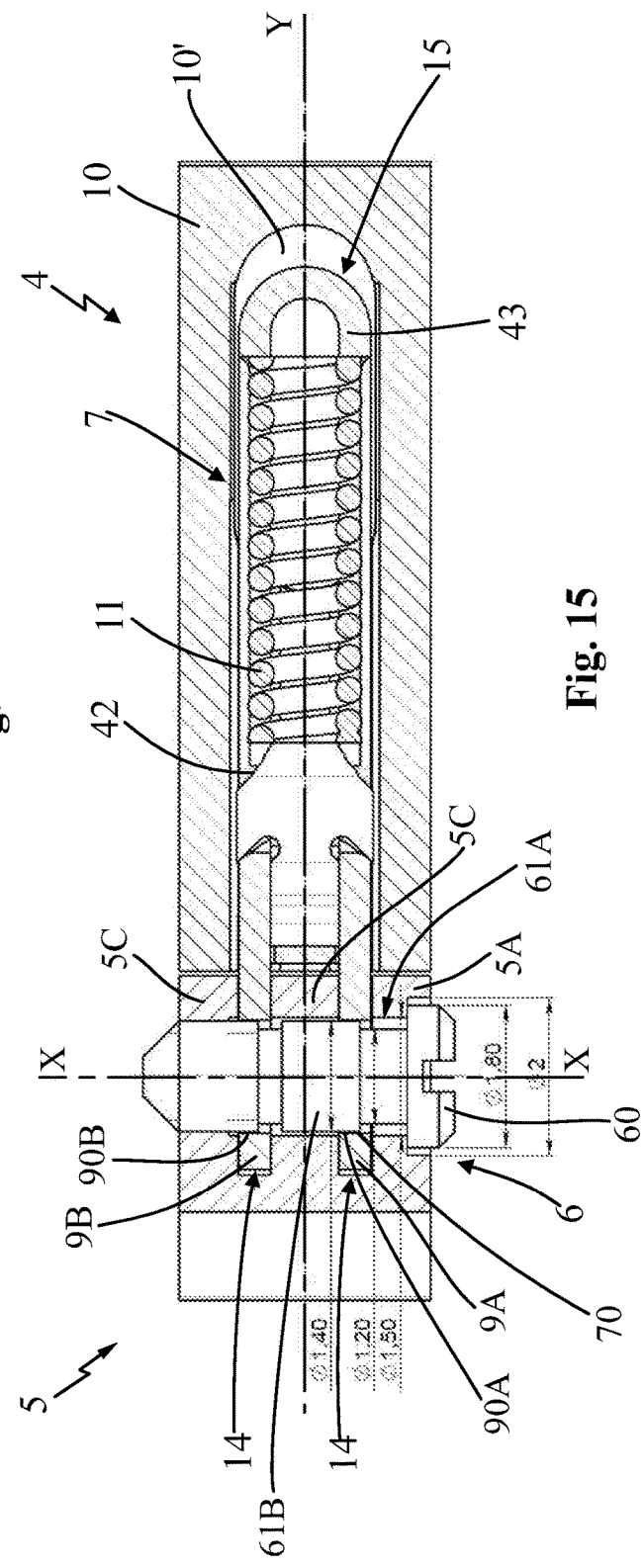
FIG. 15 shows a section view of the hinge of FIG. 13, according to the present invention, made along the trace XV-XV of FIG. 14.
Figure 16:
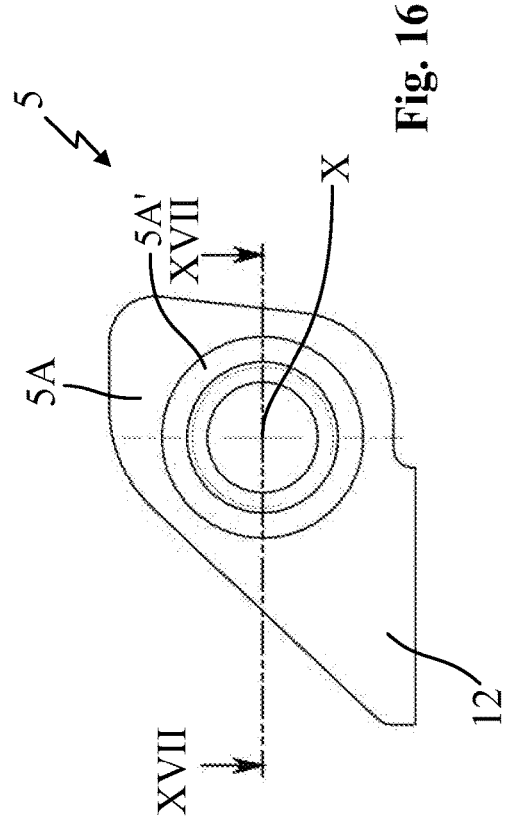
FIG. 16 shows a detail of the hinge of FIG. 13, according to the present invention, relative to a second female articulation element.
Figure 17:
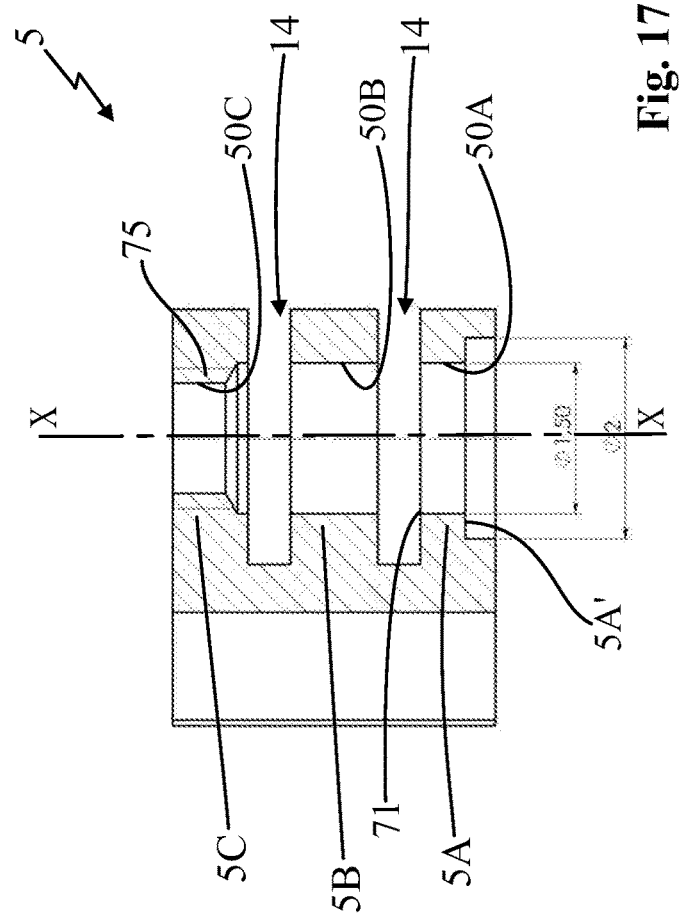
FIG. 17 shows a section view of the detail of the hinge of FIG. 16, according to the present invention, made along the trace XVII-XVII of FIG. 16.
Figure 18:
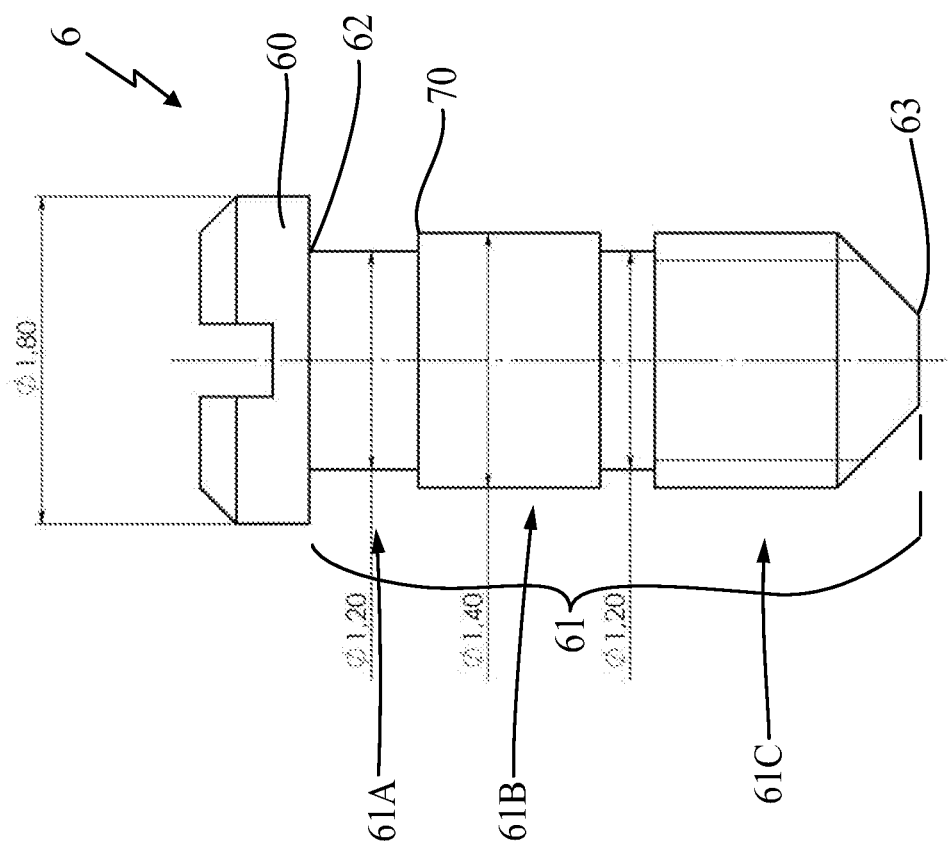
FIG. 18 shows a detail of the hinge of FIG. 13, according to the present invention, relative to an articulation screw.
Figure 20:
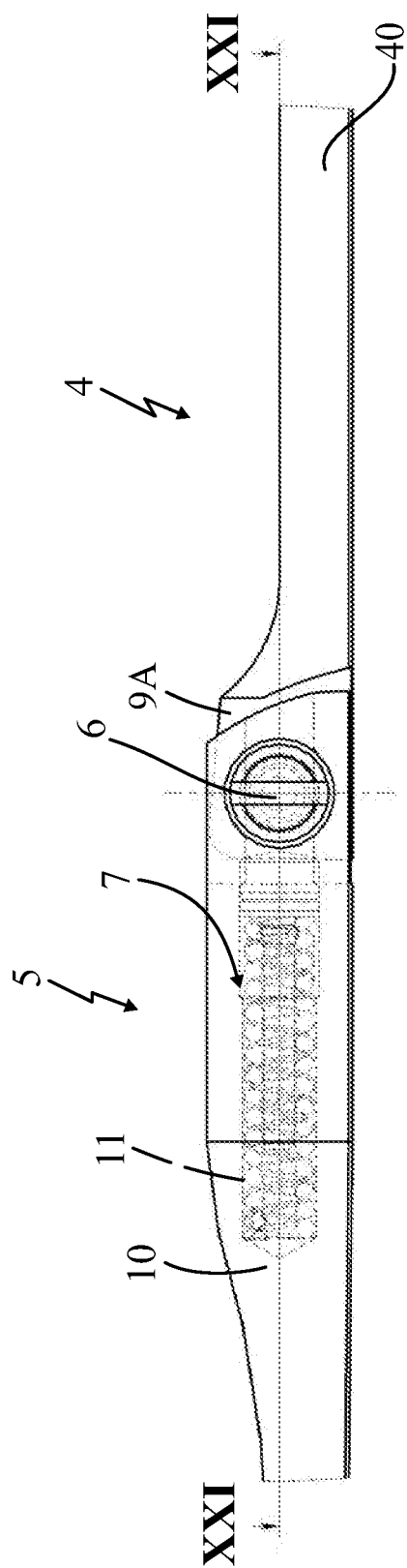
FIG. 20 shows a side view of only the hinge of FIG. 19, according to the present invention.
Figure 21:
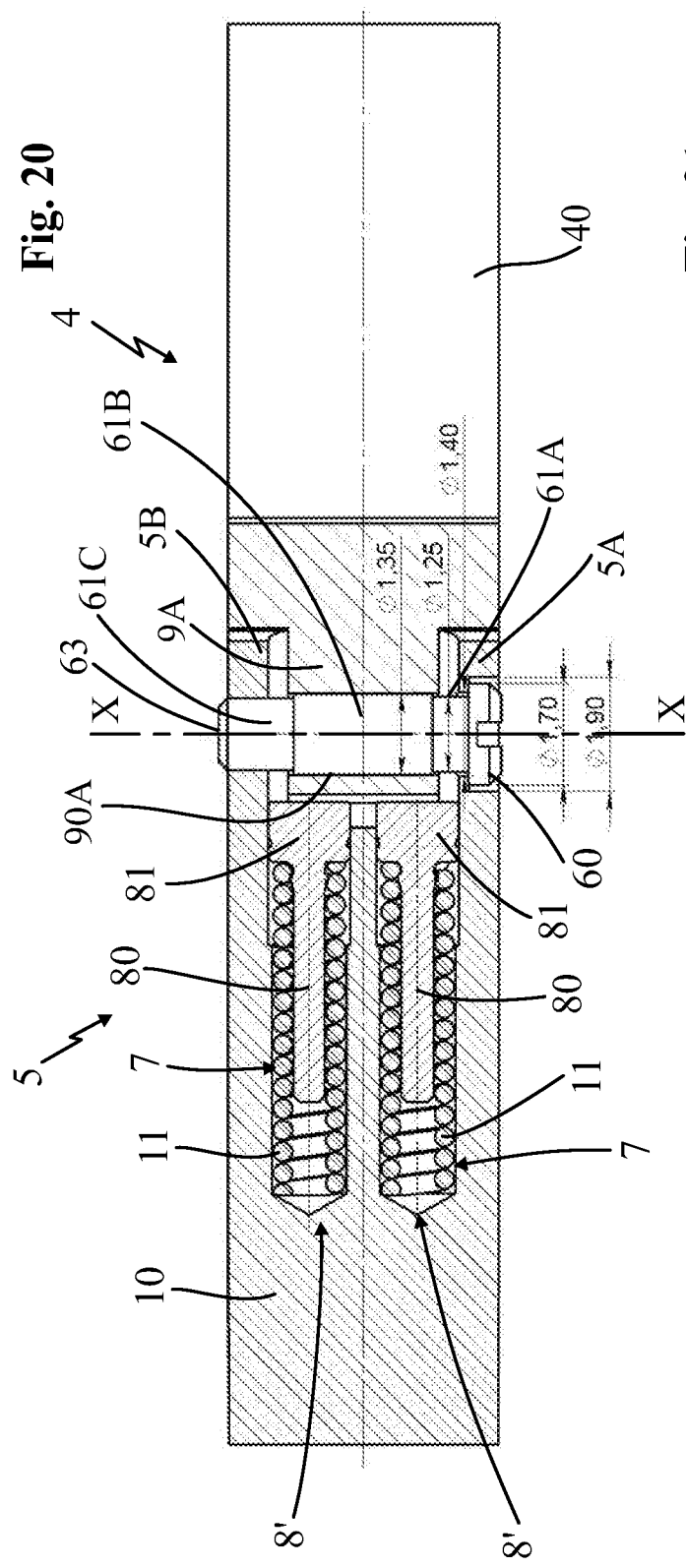
FIG. 21 shows a section view of the hinge of FIG. 19, according to the present invention, made along the trace XXI-XXI of FIG. 20.
Figure 22:
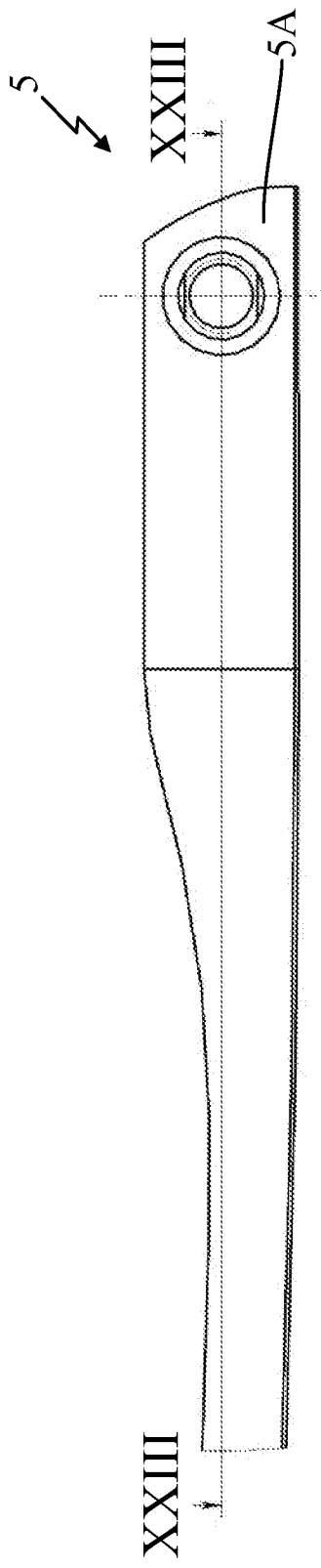
FIG. 22 shows a detail of the hinge of FIG. 19, according to the present invention, relative to a second female articulation element.
Figure 23:
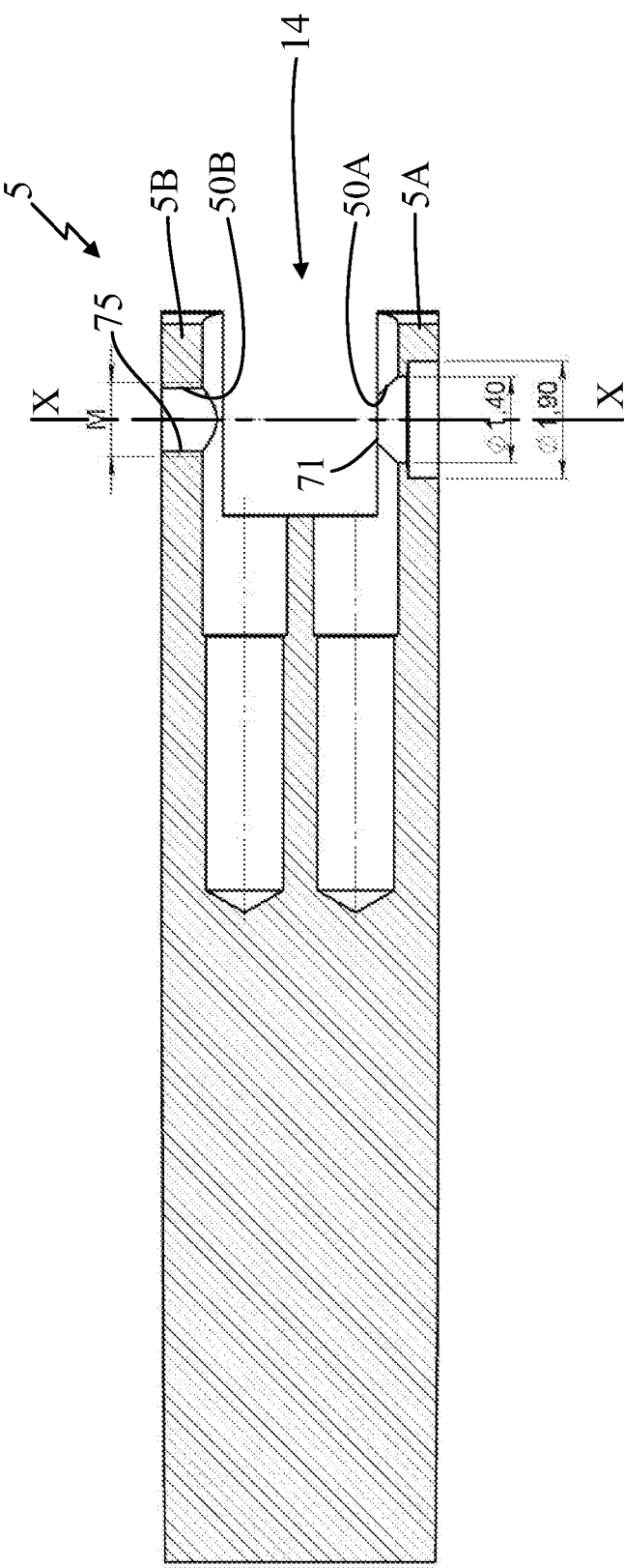
FIG. 23 shows a section view of the detail of the hinge of FIG. 22, according to the present invention, made along the trace XXIII-XXIII of FIG. 22.
Figure 24:
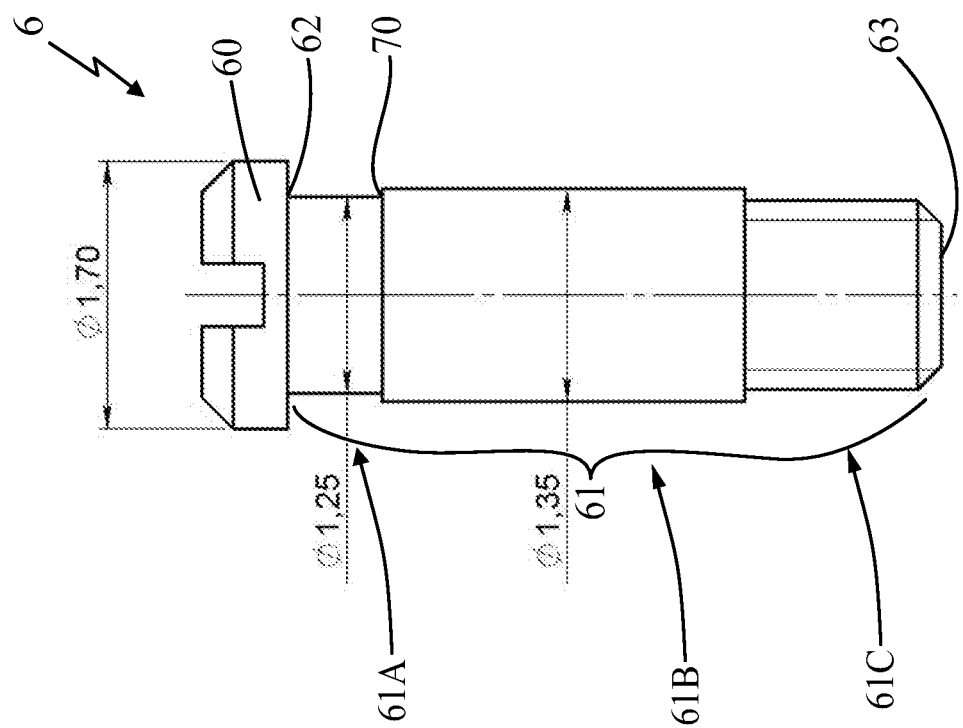
FIG. 24 shows a detail of the hinge of FIG. 19, according to the present invention, relative to an articulation screw.
Figure 26:
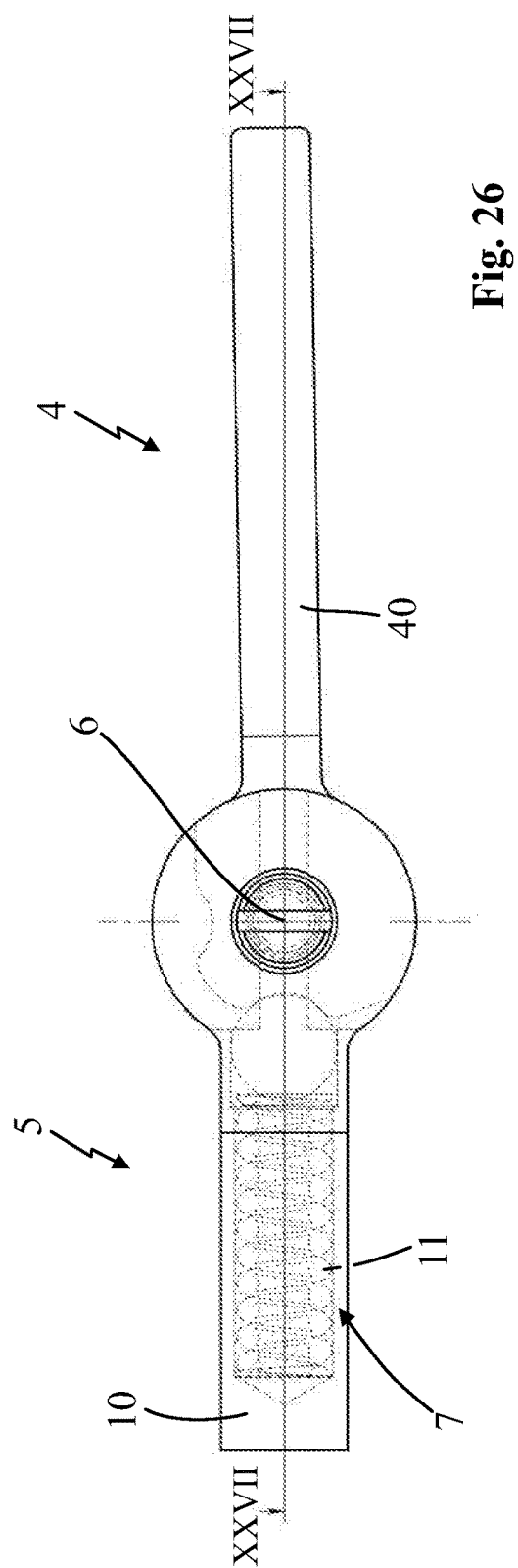
FIG. 26 shows a side view of only the hinge of FIG. 25, according to the present invention.
Figure 27:
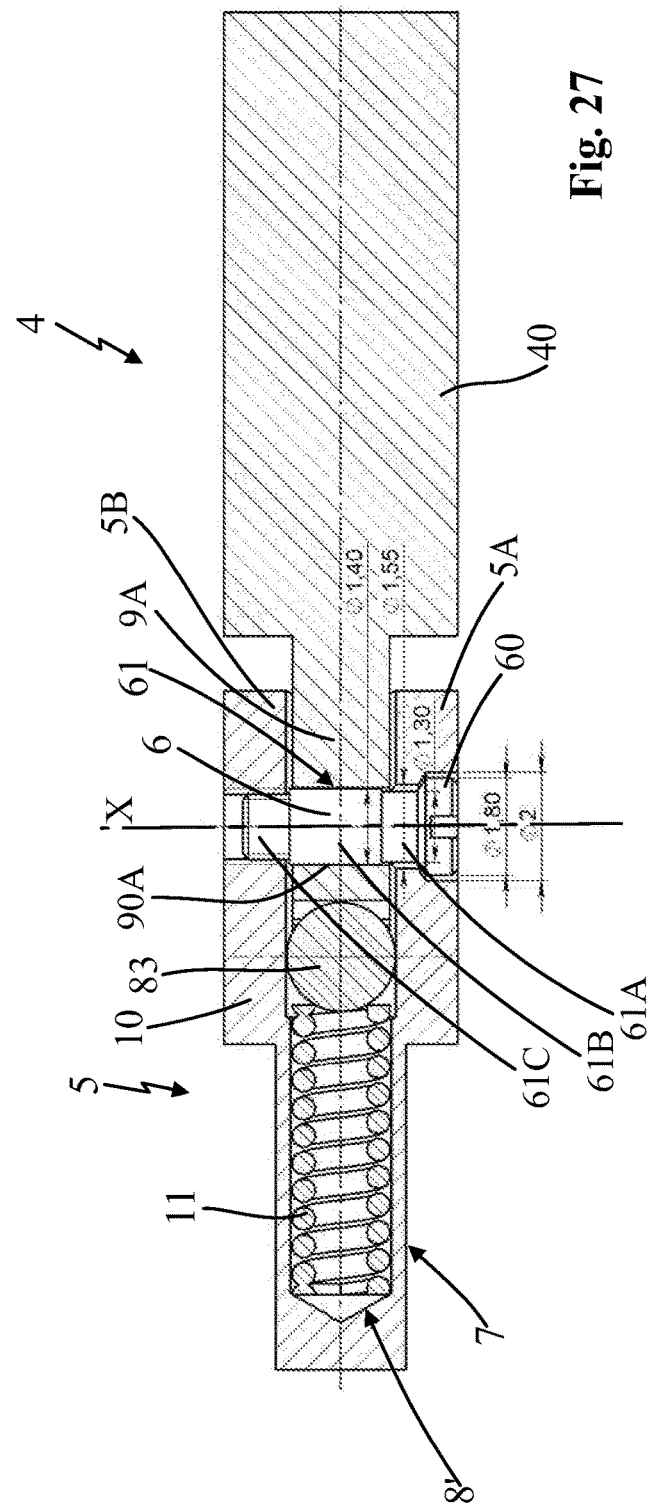
FIG. 27 shows a section view of the hinge of FIG. 25, according to the present invention, made along the trace XXVII-XXVII of FIG. 26.
Figure 28:
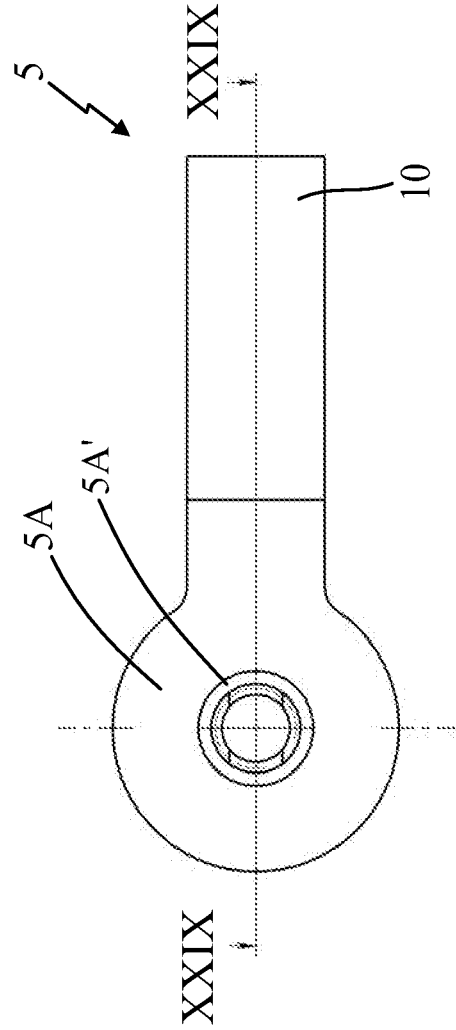
FIG. 28 shows a detail of the hinge of FIG. 259, according to the present invention, relative to a second female articulation element.
Figure 29:
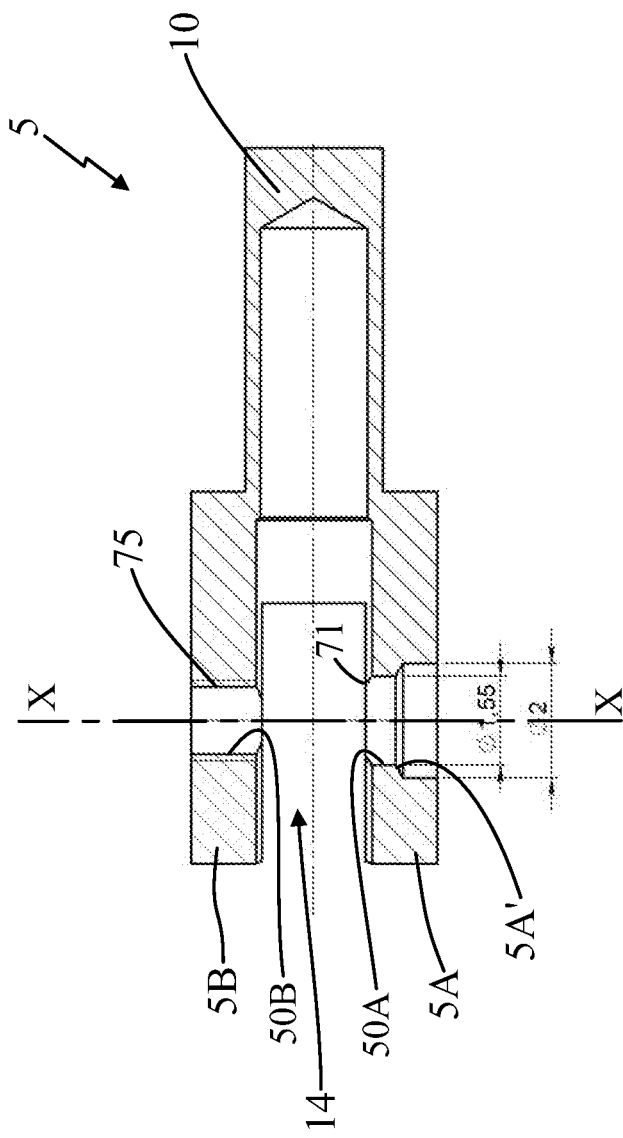
FIG. 29 shows a section view of the detail of the hinge of FIG. 28, according to the present invention, made along the trace XXIX-XXIX of FIG. 28.
Figure 30:
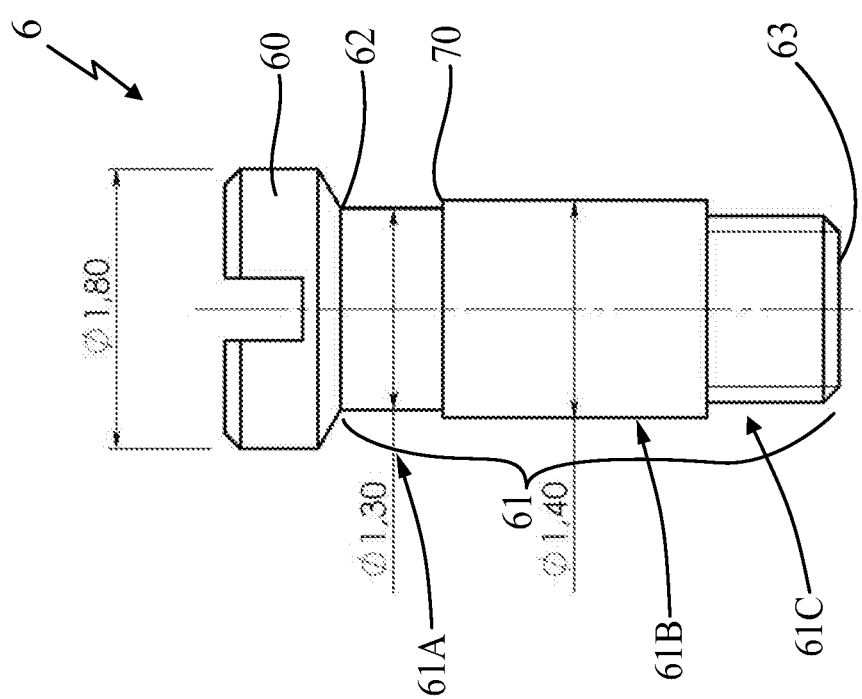
FIG. 30 shows a detail of the hinge of FIG. 25, according to the present invention, relative to an articulation screw.

With reference to the set of drawings, reference number 1 overall indicates the elastic hinge for eyeglass frames, object of the present invention.

The elastic hinge 1, according to the present invention, is intended to make eyeglass frames of any type, i.e. eyeglasses, sunglasses, sport glasses or other types of glasses and it is adapted to mutually articulate together, in a per se known manner, a temple 2 with respect to an end piece 3 of a frame for eyeglasses.

The latter will be made in a per se entirely conventional known manner, and hence for example of plastic material, such as nylon, acetate or other plastic materials suitable for such purpose, or even of metallic material. The frame does not form the object of a specific claim and therefore will only be summarily described hereinbelow, since its main structural principles are well known to a man skilled in the art.

More in detail, the frame is usually formed, in a per se conventional manner, by a front which supports a pair of lenses, connected in the central part by a bridge, and by a pair of temples 2 pivoted by means of elastic hinges 1 to the sides of the front and, more precisely, to two lateral portions thereof directed towards the rear part of the eyeglasses, known in the technical jargon of the field with the term end pieces 3.

In particular, the hinge 1 according to the present invention is of elasticized type, i.e. adapted to allow an over-travel during opening of the temples 2 with elastic return aimed to allow easily putting on the eyeglasses and aimed to ensure an improved fit of the same once worn on the head of the user.

In operation, the temples 2 can be moved, due to the aforesaid elastic hinges 1, in a per se entirely conventional manner, between a closed position, in which they are collected on the front of the eyeglasses, an open position, in which they assume a substantially right-angle position with respect to the front of the eyeglasses, and an over-travel position, in which they are forced beyond the aforesaid open position.

The elastic hinge 1 comprises two articulation elements mechanically associated with each other by means of an articulation screw 6.

More in detail, a first articulation element 4 is mechanically associable with a first component of the eyeglass frame which is represented by a temple, in accordance with the first three embodiments of FIGS. 1-6, 7-12, 13-18, while it is represented by the end piece of the front of the eyeglasses in accordance with the embodiments of FIGS. 19-24, 25-30.

The first articulation element 4 is the male of the hinge and is provided with at least one projecting head portion 9A, provided with a corresponding first hole 90A.

In the case of the first embodiment of FIGS. 1-6 or in the case of a fourth and fifth embodiment of FIGS. 19-24, 25-30, a male is provided with only one projecting head portion 9A, while in the case of the second and third embodiment of FIGS. 7-12 and 13-18 the first articulation element 4 has two projecting heads 9A, 9B, each provided with a corresponding first hole 90A, 90B.

The second articulation element 5, i.e. the female element of the hinge 1, is in turn mechanically associable with a second component of the eyeglass frame which is represented by the end piece of the front of the eyeglasses in accordance with the first three embodiments of FIGS. 1-6, 7-12, 13-18, while it is represented by a temple in accordance with the embodiments of FIGS. 19-24, 25-30.

The second articulation element 5 comprises at least one first and one second tab 5A, 5B provided with a corresponding second hole 50A and third hole 50B aligned with each other. If the first articulation element 4 has two heads 9A, 9B, then correspondingly the second articulation element 5 will also comprise a third tab 5C provided with a corresponding fourth hole 50C aligned with the other two holes 50A and 50B.

The two tabs 5A, 5B of the first, fourth and fifth embodiment delimit a slit 14 therebetween, in which the head portion 9A of the first articulation element 4 is inserted. The three tabs 5A, 5B and 5C of the second and third embodiment delimit two slits 14 therebetween, in which the two head portions 9A and 9B of the first articulation element 4 are inserted.

The first and the second articulation element 4 and 5 are then mutually pivoted with respect to each other by means of an articulation screw 6 inserted in the abovementioned holes, which when the articulation screw 6 is mounted are arranged aligned with each other, with transverse axis X.

The hinge 1 thus comprises a containment structure 10 extended along a longitudinal axis Y, which is fixed to one of the components of the eyeglass frame (temple 2 or front 3) and is mechanically associable with one of the two articulation elements 4, 5. Advantageously, and in accordance with all the embodiments of the enclosed figures, the containment structure 10 is always associated with the temple 2, also because its elongated forms renders it more suitable for being mounted therein.

The containment structure is therefore associated with the first articulation element in accordance with the first three embodiments, and with the front 3 in accordance with the latter two embodiments of the enclosed figures.

Within the containment structure 10, an elastic device 7 is housed which is slidably movable along the longitudinal axis Y of the same containment structure 10.

The elastic device 7 comprises at least one spring 11 which acts elastically on the at least one head portion 9A of the first articulation element 4. In accordance with the embodiments of the first three embodiments, the spring acts directly on the head portion 9A or on an element integral therewith, while in accordance with the latter two embodiments the spring acts on the head portion 9A by pushing another element (such as a piston or a sphere) against it.

In accordance with the idea underlying the present invention, the aforesaid articulation screw 6 comprises an (enlarged) head 60 and a shank 61 provided with a first end 62 connected to the head 60 and with a second free end 63 placed at the opposite end of the shank 61 with respect to the head 60.

The shank 61 of the articulation screw 6 consists of at least one narrow annular portion 61A, which is extended for a first section of the shank 61 starting from its first end 62 and is engaged in the second hole 50A of the first tab 5A of the second articulation element 5. Advantageously, in accordance with the examples of the enclosed photographs, the head 60 of the articulation screw 6 is at least partially embedded within the second hole 50A of the first tab 5A, which is provided with a cavity with an abutment edge 5A' that is internally projecting towards the axis of the second hole 50A, advantageously in order to receive in abutment the head 60 of the articulation screw 6 when the latter is in an end stop position P1 (see FIG. 31). More in detail, the head 60 of the articulation screw 6 abuts against such abutment edge 5A' with a neck surface 60A thereof which is connected to the shank 61 and which can be tilted or form a right angle with the surface of the shank 61.

According to the present invention, the shank 61 thus has at least one enlarged annular portion 61B, which has diameter greater than the diameter of the aforesaid narrow annular portion 61A, is extended for a second section of the shank 61, placed adjacent to the first section, starting from the narrow portion 61A forming a step 70 and is engaged in the first hole 90A of the head portion 9A of the first articulation element 4.

The abovementioned elastic device 7 exerts, on the aforesaid enlarged annular portion 61B of the shank 61 of the articulation screw 6, an elastic force transverse to the axis of the articulation screw 6 through the head portion 9A of the first articulation element 4.

Finally, the shank 61 of the articulation screw 6 also has at least one threaded portion 61C, which is engaged in a nut screw 75 made in the third hole 50B of the second tab 5B of the second articulation element 5 and is placed between the enlarged annular portion 61B and the second free end 63 of the shank 61 of the pin 6.

Such threaded portion 61C of the shank 61 can be contiguous with the enlarged annular portion 61B and be extended substantially up to the free end 63 of the shank, as in particular in the case of the first embodiment of FIGS. 1-6, of the fourth embodiment of FIGS. 19-24 and of the fifth embodiment of FIGS. 25-30, or it can terminate with a non-threaded, thinned portion 64, as in the second embodiment of FIGS. 7-12, or it can be separated from the enlarged annular portion 61B by a second narrow portion 61A, as in the third embodiment of FIGS. 13-18.

The articulation screw 6 is susceptible of assuming, beyond the possible abovementioned end stop position P1, in which the articulation screw 6 has the threaded portion 61C tightened such that its head 60 abuts against the first tab 5A of the second articulation element 5, also a blocking position P2, i.e. partially unscrewed, in which the articulation screw 6 is tilted with respect to the axis of the at least three aligned holes 90A, 50A, 50B, in response to the elastic force exerted by the spring of the elastic device 7 on the enlarged annular portion 61B of the shank 61 of the articulation screw 6 that is transverse with respect to the axis of the articulation screw 6 itself and through the head portion 9A of the first articulation element 4 which is maintained by the spring constantly in abutment against the enlarged annular portion 61B.

More clearly, as soon as the articulation screw 6 is no longer screw-tightened in a tightened end stop position P1, but rather its threaded portion 61C is loosened or at least partially unscrewed, e.g. advantageously with a travel corresponding to a rotation comprised between a half-revolution and two revolutions, the transverse force exerted by the spring causes a tilt of the articulation screw 6. Indeed, the clearances present between the articulation screw 6 and the holes 90A, 50A, 50B and in particular between the threaded portion 61C and the nut screw of the third hole 50B determine, already with a slight loosening of the screwing of the threaded portion 61C, a tilt of the articulation screw 6.

In such blocking position P2 of the articulation screw 6, the step 70 of the enlarged annular portion 61B interferes with the internal annular edge 71 of the second hole 50A of the first tab 5A of the second articulation element 5, preventing a further unscrewing of the articulation screw 6.

Therefore, due to the shape of the articulation screw 6 and to the interference of the step 70 with its enlarged annular portion 61B with the internal annular edge 71 of the second articulation element 5, the present invention prevents the unscrewing of the articulation screw 6 even after many work cycles.

Figure 31:
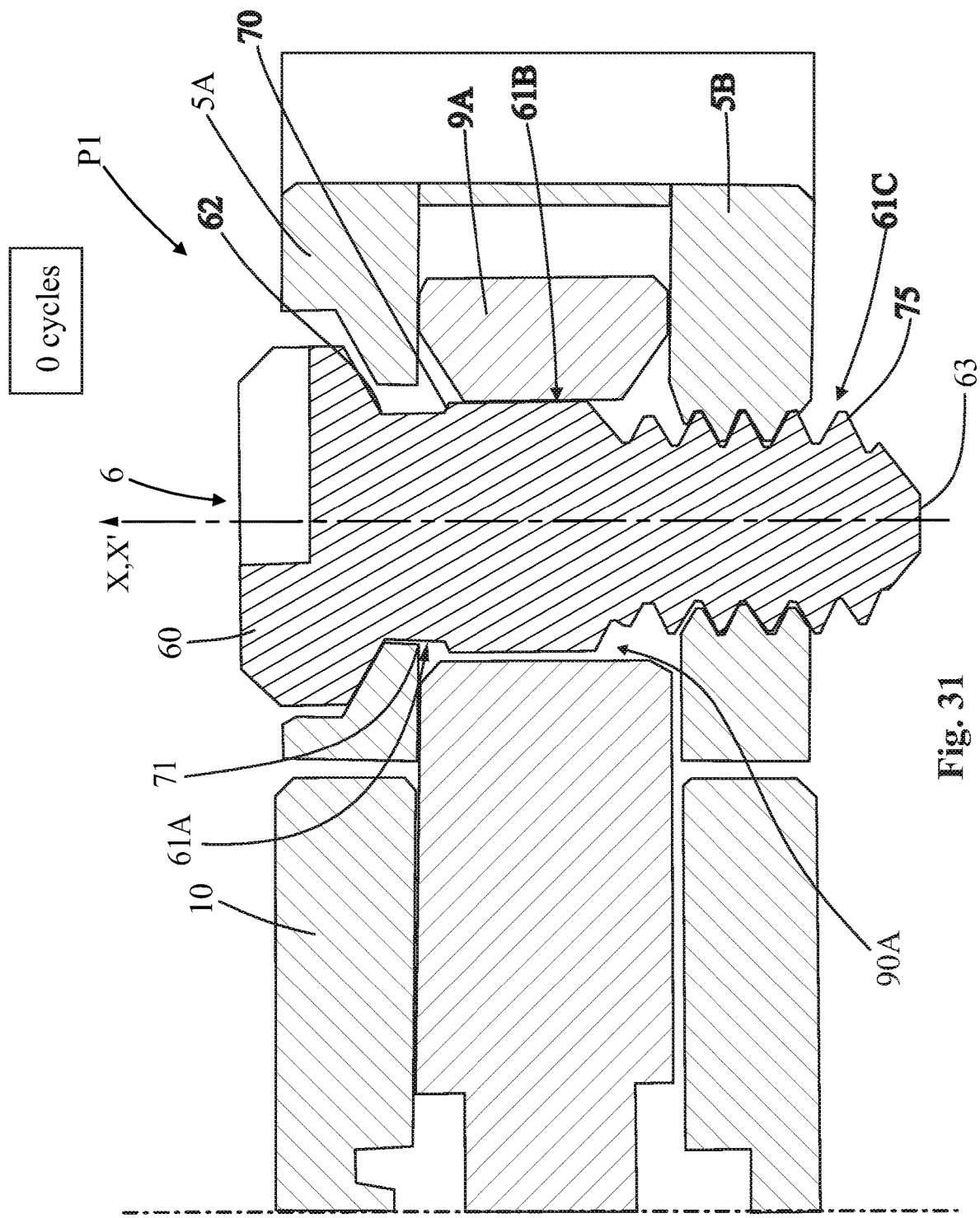
FIG. 31 shows a longitudinal section view of a detail of the hinge of FIG. 1, according to the present invention, relative to an articulation screw inserted in the holes of two articulation elements of the hinge, the hinge not having been subjected to any opening/closing cycle and the pin being in an end stop position.
Figure 32:
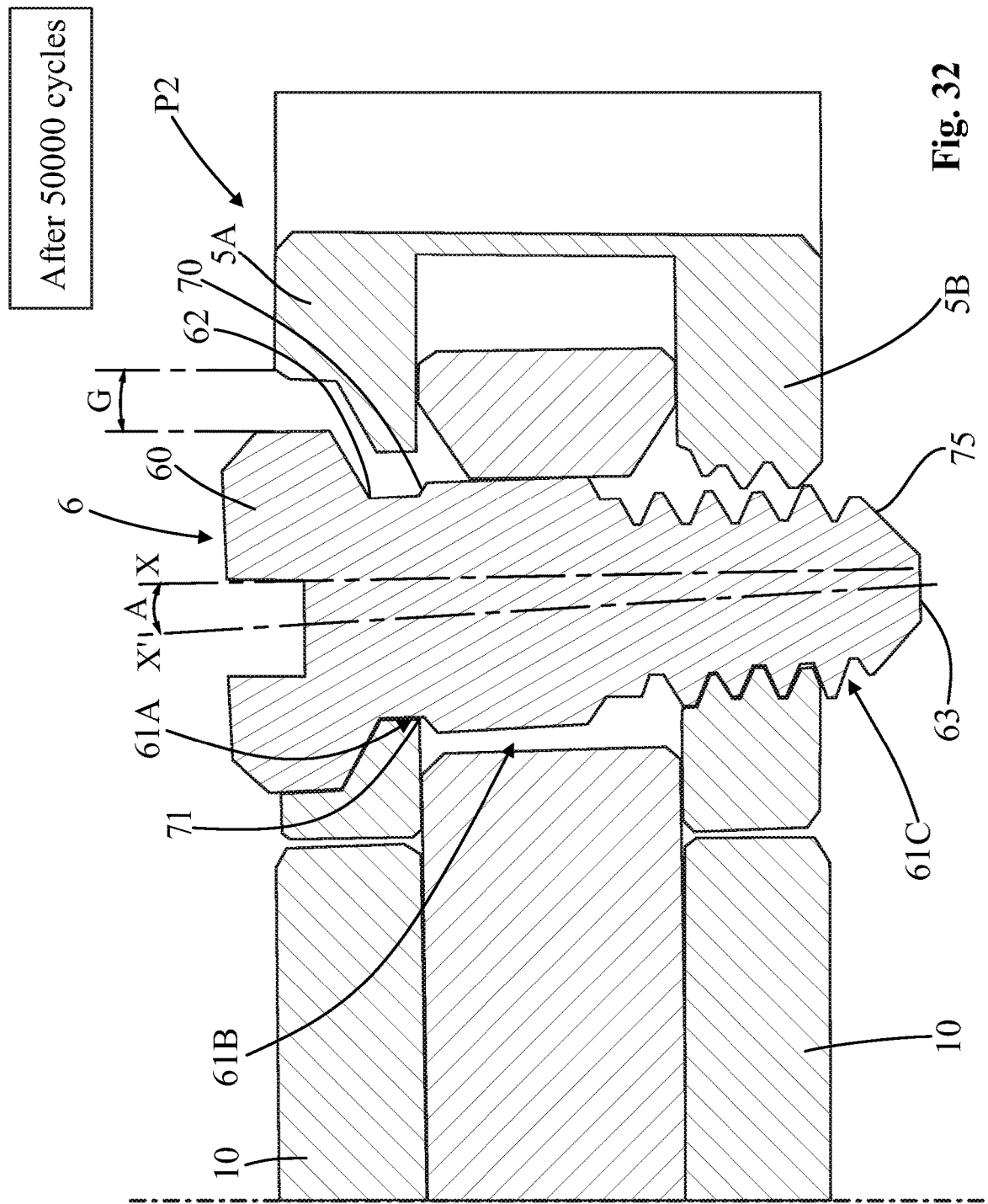
FIG. 32 shows the longitudinal section view of the detail of the hinge of FIG. 31, according to the present invention, the hinge having been subjected to 50000 opening/closing cycles and the pin being in a blocking position.

Such characteristics are clearly visible in the photographs of FIGS. 31 and 32 which represent: the first a portion of the hinge, object of the present invention (and in particular that of the first embodiment), when the hinge substantially has not yet started to work and in which the articulation screw 6 is centered with its axis X' on the X of the aligned holes and has the threaded portion 61C tightened in a manner such that the head 60 of the screw 6 is in abutment against the first tab 5A of the second articulation element 5; the second photograph is the same portion of the hinge of the photograph 31 but after the hinge 1 has worked for a considerably number of cycles of its lifetime and in which the articulation screw 6 is no longer centered with its axis X' on the axis of the aligned holes X but rather assumes a position tilted by an angle A and has the threaded portion 61C loosened in a manner such that the head 60 of the screw 6 no longer abuts against the first tab 5A of the second articulation element 5.

As is clear from photograph 32, the step 70 of the enlarged annular portion 61B interferes with the internal annular edge 71 of the second hole 50A, preventing a further rotation of the articulation screw 6.

More in detail, the narrow annular portion 61A of the shank 61 of the articulation screw 6 is engaged in the second hole 50A of the first tab 5A with a clearance G of value adapted to allow the articulation screw 6 to be tilted by such angle A up to reaching the aforesaid blocking position P2, in which the step 70 interferes against the internal annular edge 71 of the second hole 50A, preventing a further rotation of the articulation screw 6. Such blocking position P2 is advantageously reached already with a rotation of the articulation screw 6 comprised between a half-revolution and two revolutions.

Advantageously, the clearance G of the narrow annular portion 61A of the shank 61 in the second hole 50A of the articulation screw 6 is comprised between 0.15 and 0.30 millimeters.

The above-described hinge 1 in accordance with the present invention is susceptible of assuming numerous embodiment variants without departing from the protective scope of the present patent.

In accordance with the first three embodiments represented in FIGS. 1-18, the elastic hinge 1 for eyeglass frames provides that the first articulation element 4 (male) be mechanically associated with a temple 2 of the eyeglass frame, while the second articulation element 5 (female) be mechanically associated with the front 3 of the eyeglass frame.

In accordance with such embodiments the first articulation element 4 comprises the containment structure 10 and the elastic device 7 arranged within the containment body 10.

The containment structure 10 can be obtained with a box-like body fixed to the temple 2, or in accordance with a non-represented embodiment it can be made within the temple 2 directly during the steps of producing the same temple 2.

More in detail, the containment structure 10 is fixed to the temple 2 for example by means of welding to the metallic core 80 of the temple 2 or by means of fixing of the core 80 in a hole of the containment structure 10, or once again by at least partially embedding the containment structure 10 in the nylon or acetate material that composes the temple 2.

In turn, the elastic device 7, in accordance with the first three embodiments of the enclosed figures, comprises one or more carriages 8, each of which slidably movable within the containment structure 10. In accordance with the first embodiment, only one carriage 8 is provided that is equipped with the head portion 9A which projects from the containment structure 10 and which is provided with a corresponding first hole 90A, while in accordance with the second embodiment two carriages 8 are provided, equipped with the corresponding head portions 9A, 9B, which both project from the containment structure 10 and which are provided with corresponding first holes 90A, 90B.

It is observed that, in accordance with the third embodiment, a single carriage 8 is provided which nevertheless terminates with two projecting head portions 9A and 9B provided with corresponding first holes 90A, 90B.

In the case of only one carriage 8 as provided by the first and by the third embodiment, the containment structure 10 delimits a single slide seat 10', while in the case of two carriages 8 of the second embodiment, the containment structure delimits two corresponding slide seats 10", and each of which slidably houses a corresponding carriage 8 at its interior.

The elastic device 7 thus comprises only one spring 11 in the case of the first and third embodiment and two springs 11 in the case of the second embodiment.

Each spring 11 is aimed to push the corresponding carriage 8 towards the interior of the containment structure 10 and for such purpose acts both on the carriage 8 and on the containment structure 10.

More in detail, each carriage 8 of the first articulation element 4 comprises a male element 15, which is provided with a main longitudinal extension along the slide axis Y parallel to that of the temple 2 and consists of a neck portion 42 and of a rod-like portion 43 and of at least one head portion 9A. In accordance with the third embodiment the same carriage has two head portions 9A, 9B.

In the case of the second embodiment (FIGS. 8-12), two separate carriages 8 are present and the two head portions 9A, 9B are part of two separate male elements 15, each head portion 9A, 9B thus being fixed to a corresponding neck portion 42. Otherwise, in the case of the third embodiment (FIGS. 13-18), there is a single carriage 8 and the two head portions 9A, 9B refer to a single male element 15, thus both being fixed to a common neck portion 42. The rod-like portion 43 is in this case hollow in order to contain the spring 11 at its interior.

In any case, each head portion 9A, 9B is extended outside the containment structure 10 of the temple 2, and is provided with a corresponding first hole 90A, 90B, intended to be engaged by the pin 6.

The neck portion 42 is extended rearward from the head portion 9A, 9B along the longitudinal extension axis Y and can be shaped with an advantageously prismatic form, e.g. parallelepiped in order to prevent the rotation of the male element 15 of the carriage 8 around its longitudinal extension axis inside the containment structure 10, suitably counter-shaped in its initial guide section with respect to the aforesaid neck portion 42.

The rod-like portion 43 is extended starting from the rear face of the neck portion 42 and has at the free end, in accordance with the first two embodiments, an enlarged head 45 for example constituted by the head of a screw or of a pin or by a riveting of the end of the rod-like portion 43.

The abovementioned spring 11, aimed to push the carriage 8 towards the interior of the containment structure 10, is advantageously coaxially wound around the rod-like portion 43 of the male element 10 (in accordance with the aforesaid first two embodiments) and abuts with one end thereof against the enlarged head 45 of the rod-like portion 43 of the male element 10, and with the other end against an end stop obtained for example with step or ring or another element internally projecting from the containment structure 10 (e.g. produced by means of punching) in order to interfere with the spring 11, at an intermediate position of the rod-like portion 43 or at the neck 42 of the male element 15.

In accordance with the aforesaid first two embodiments illustrated in the enclosed FIGS. 1-12, the aforesaid end stop is obtained with a blocking element constituted by a ring 17 coaxially mounted around the neck of the male element 15 and provided with two check tabs 18 which ensure that once the carriage 8 is inserted in the containment structure 10, they are engaged with the latter, defining with the ring 17 the blocking of the carriage 8 in the relative seat 10', 10" with the only degree of freedom that of sliding along the axis Y.

Otherwise, in accordance with the third embodiment, the spring 11 is inserted in a seat of the male element 15, is in abutment at one end thereof against the curved termination of the male element 15 which delimits such seat, while at the opposite end it abuts against a blocking element 17' integral with the containment structure 10.

In accordance with the first three embodiments of FIGS. 1-18, the second articulation element 5 is for example obtained in a per se entirely conventional manner with a metallic body provided with two parallel tabs 5A, 5B, in the case of the first embodiment and with three parallel tabs 5A, 5B, 5C, in the case of the second and third embodiment. The tabs are fixed to a common base 12 from which, for example in accordance with the second embodiment, one or more undercut feet 13 are extended, embedded in the plastic matrix of the end piece 3 of the eyeglasses.

Otherwise, without departing from the protective scope of the present patent, the second articulation element 5 can be obtained, still in a per se entirely conventional manner, integral in the plastic material of the end piece 3 with the parallel tabs 5A, 5B (or even 5C) integrally made in the plastic of the end piece 3.

Otherwise, additionally, in the case of metallic eyeglasses, the second articulation element 5 can be made of a metallic body welded to the end piece 3 of the frame (in accordance with the example of the first embodiment).

The two tabs 5A, 5B of the first embodiment or the three tabs 5A, 5B, 5C of the second and third embodiment of the second articulation element 5 are respectively provided with corresponding second and third hole 50A, 50B, or with second, third and fourth hole 5A, 5B and 50C and are parallel to each other and equidistant so as to respectively delimit one or two corresponding slits 14 therebetween, in which the head portion 9A or the two head portions 9A, 9B are inserted.

More in detail, in the case of the first embodiment, the first tab 5A of the second articulation element 5 is provided with a second through hole 50A shaped with a cavity in which the head 60 of the pin 6 is housed, while the second tab 5B is provided with a third hole 50B having the nut screw 70. In the case of the second embodiment, the third tab 5C has a fourth hole 50C advantageously with diameter smaller than or equal to the other two 50A, 50B. In the case of the third embodiment, the third tab 5C has a fourth hole 50C which is threaded, presenting the nut screw 70.

In accordance with the fourth and fifth embodiment of FIGS. 19-30, the elastic device 7 formed by one or more carriages 8 in the three preceding solutions is now otherwise formed by one or more elastic pushers 8', which act, pushed by respective springs 11, against the shaped profile of the head portion 9A (or otherwise in accordance with a non-illustrated embodiment against the shaped profile of the head portions 9A, 9B). For such purpose, in accordance with the fourth embodiment, the pushers 8' housed within the containment structure 10 comprise a piston 80 at one end thereof associated with an enlarged head 81. The latter acts as an abutment for the spring 11, which is wound around the axis of the piston 80, and as slide element on the profile of the head portion 9A of the first articulation element 4.

Otherwise, in accordance with the fifth embodiment, the pushers 8' housed within the containment structure 10 comprise a sphere 83 which is pushed by the spring 11 against the profile of the head portion 9A of the first articulation element 4.

The enlarged head 81 or the sphere 83 act on the cam profile of the head portion 9A (or otherwise in accordance with a non-illustrated embodiment against the shaped profile of the head portions 9A, 9B) of the first articulation element 4 integral with the end piece 3 of the front of the eyeglasses, through such head portion 9A exerting an elastic force on the articulation screw 6.

In accordance with the fourth and the fifth embodiment illustrated in FIGS. 19-30, the first articulation element 4 is provided with a fixing base 40 and with only one head portion 9A projectingly fixed above the fixing base 40. The latter is fixed to the end piece of the eyeglasses for example by means of welding.

The elastic device 7 formed by one or more elastic pushers 8' and by the spring 11 is still contained in the containment structure 10 but in this case the spring 11 is adapted to push the pusher 8' towards the exterior of the containment structure 10.

As in the case of the first three embodiments, also in the case of the latter two embodiments the two tabs 5A, 5B of the second articulation element 5 comprise a first tab 5A, provided with a second through hole 50A shaped with a cavity 5A' in which the head 60 of the articulation screw 6 is housed, and a second tab 5B, provided with a third central hole 50B having the nut screw (and possibly in accordance with a non-illustrated embodiment, also with a third tab 5C having a fourth hole 50C advantageously of diameter smaller than or equal to the other two holes 50A, 50B).

Otherwise, from the preceding examples, the containment structures 10 of the elastic devices 7, even if always associated with the temples 3, are in this case associated with the second articulation elements 5 and are advantageously obtained with blind seats having longitudinal extension Y and made between the tabs 5A, 5B as a continuation of the slit 14.

The head of the piston 81 or sphere 83 of the elastic pusher 8' act on the cam profile provided on the head portion 9A of the first articulation element 4 through the action of the spring 11. Unlike the elastic devices 7 with carriage 8 considered for the first three embodiments, in which the spring acts in the sense of drawing the carriages inside the relative containment structure 10, in accordance with the fourth and the fifth embodiment the piston 80 or the sphere 83 are pushed by the spring towards the exterior of the containment structure 10 and are retained by the cam of the head portion 9A associated with the first articulation element 4, fixed to the end piece 3 of the front, which thus reacts to the compression force of the spring 11.

As is per se already known to the man skilled in the art, the cam profile of the head portion 9A determines the positions of opening, closing and extra-opening of the temples.

Therefore, in accordance with the present invention and with all the abovementioned embodiments, the elastic device 7 slidably movable along the longitudinal axis Y of the containment structure 10 provides that the at least one spring 11 act on the head portion or portions 9A, 9B, transmitting an elastic action thereto. This takes place both if the head portion 9A or the head portions 9A and 9B are part of the carriages 8 and hence of the same elastic device 7 (in accordance with the first three embodiments of FIGS. 1-8), and in the case of the examples of FIGS. 19-30, in which the head portion 9A (but as stated, an embodiment with two head portions 9A, 9B could be provided) is outside the elastic device 7 since it is associated with the opposite articulation element with respect to that associated with the elastic device 7.

According to the idea underlying the present invention, an elastic force on the head portion 9A is always present, such force transmitted to the articulation screw 6 by tilting it as specified above.

The hinge 1 thus conceived therefore attains the predetermined objects and in particular is capable of working even for 50,000 opening/closing cycles without loosening the articulation screw 6 beyond a couple revolutions (and preferably not beyond a single revolution), i.e. preventing the screw from exiting from the holes of the two coupled articulation elements.

It is in any case clear that the elastic hinge described up to now can be modified without departing from the scope of the invention.

Hereinbelow, a method is described for retaining the articulation screw of the elastic hinge 1 for eyeglass frames, which for ease of reference will now be described by maintaining the above-reported references employed for the description of the relative hinge 1.

Such method provides for a step of tightening the articulation screw 6, preferably but not necessarily up to the end stop position P1 in which its head 60 is in abutment against the first tab 5A of the second articulation element 5. During such tightening step, moreover, the threaded portion 61C of the articulation screw 6 is screwed in the nut screw 75 made in the third hole 50B of the second tab 5B of the second articulation element 5.

Following the tightening step, and advantageously upon reaching the end stop position P1, the articulation screw 6 has the extension axis X substantially parallel to the hinging axis X of the aforesaid first, second and third hole 90A, 50A, 50B.

There is then a step of loosening of the articulation screw 6, which brings the articulation screw 6 itself to assume the blocking position P2 (advantageously starting from the aforesaid end stop position P1). In such position, the articulation screw 6 is tilted with respect to the hinging axis X of the first, second and third hole 90A, 50A, 50B and interferes by means of the step 70 of its enlarged annular portion 61B against the internal edge 71 of the second hole 50A of the first tab 5A of the second articulation element 5, preventing a further unscrewing of said articulation screw 6.

Advantageously, the method provides that after the tightening step, there is preferably a normal working step, in which the hinge 1 is subjected to a plurality of opening and closing cycles for example following a normal use of the eyeglasses. During such working step, or even during a first part thereof, for example after several tens of seconds, the aforesaid loosening step takes place.

Advantageously, the method according to the invention provides for a step of milling the first tab 5A of the second articulation element 5 in order to make the second hole 50A of size adapted to create a clearance G with the narrow annular portion 61A of the shank 61 of the articulation screw 6. The value of the aforesaid clearance G is designed for tilting the articulation screw 6 in the blocking position P2 such that it is in interference by means of the step 70 with the internal edge 71 of the second hole 50A of the first tab 5A of the second articulation element 5.

The blocking position P2 is preferably for example reached starting from the end stop position P1, with a rotation travel of the articulation screw 6 comprised between a half-revolution and two revolutions. In this manner, the articulation screw 6 already stops being unscrewed with a slight loosening thereof.

The invention claimed is:

1. An elastic hinge for eyeglass frames, which comprises:
    a first articulation element (4), intended to be mechanically associated with a first component of an eyeglass frame and provided with at least one projecting head portion (9A), having a corresponding first hole (90A);
    a second articulation element (5), intended to be mechanically associated with a second component of the eyeglass frame and comprising at least one first tab (5A) and a second tab (5B), which are respectively provided with a second hole (50A) and with a third hole (50B) and delimit therebetween at least one slit (14), in which said head portion (9A) is inserted;
    a containment structure (10) extended along a longitudinal axis (Y), intended to be mechanically associated with one of said first components and second components of the eyeglass frame,
    an elastic device (7), which is housed within said containment structure (10), is slidable along said longitudinal axis (Y) and comprises at least one spring (11) elastically acting on said head portion (9A);
    an articulation screw (6) engaged in said first hole (90A), second hole (50A) and third hole (50B), which are aligned with each other along a hinging axis (X), in order to rotatably couple together said first articulation element (4) and said second articulation element (5);
    wherein said articulation screw (6) comprises a head (60) and a shank (61), wherein said shank (61) is provided:
        with a first end (62) connected to said head (60);
        with a second free end (63) opposite said head (60);
        with at least one narrow annular portion (61A), which is engaged in the second hole (50A) of the first tab (5A) of said second articulation element (5), is extended for a first section of said shank (61) starting from the first end (62) of said shank (61),
        with at least one enlarged annular portion (61B), which is engaged in the first hole (90A) of the head portion (9A) of said first articulation element (4), is extended for a second section of said shank (61) adjacent to the first section starting from said narrow annular portion (61A), forming a step (70); the enlarged annular portion (61B) of the shank (61) of said articulation screw (6) being subjected to the transverse elastic force of said elastic device (7) through said head portion (9A);
        with at least one threaded portion (61C), which is engaged in a nut screw (75) made in the third hole (50B) of the second tab (5B) of said second articulation element (5), and is placed between said enlarged annular portion (61B) and said second free end (63);
    wherein said articulation screw (6) is susceptible of assuming a blocking position (P2), in which said articulation screw (6) is loosened and is tilted with respect to the hinging axis (X) of said first hole (90A), second hole (50A) and third hole (50B), in response to said transverse elastic force, with the step (70) of said enlarged annular portion (61B) which interferes with an internal annular edge (71) of the second hole (50A) of the first tab (5A) of said second articulation element (5), preventing a further unscrewing of said articulation screw (6);
    wherein the second hole (50A) of said second tab (5A) receives the narrow annular portion (61A) of the shank (61) of said articulation screw (6) with a clearance (G) of value designed for tilting said articulation screw (6) in said blocking position (P2) with said step (70) in interference against the internal annular edge (71) of the second hole (50A) of the first tab (5A) of said second articulation element (5).

2. The elastic hinge of claim 1, wherein said articulation screw (6) is also susceptible of assuming an end stop position (P1), in which the articulation screw (6) is tightened with its head (60) in abutment against the first tab (5A) of said second articulation element (5), and is substantially aligned with the hinging axis (X) of said first (90A), second hole (50A) and third hole (50B).

3. The elastic hinge of claim 2, wherein said blocking position (P2) is defined with respect to said end stop position (P1) with a loosening travel substantially comprised between a half-revolution and two revolutions of said articulation screw (6).

4. The elastic hinge of claim 2, wherein the second hole (50A) of said first tab (5A) is shaped with an abutment edge (5A') that is internally projecting and susceptible of receiving the head (60) of said articulation screw (6) in abutment in said end stop position (P1).

5. The elastic hinge of claim 1, wherein said clearance (G) is comprised between 0.15 and 0.30 millimeters.

6. The elastic hinge of claim 1, wherein said first articulation element (4) is mechanically associated with a temple (2) of the eyeglass frame, and said second articulation element (5) is mechanically associated with a front (3) of the eyeglass frame;
wherein said first articulation element (4) comprises:
said containment structure (10), which is intended to be fixed to said temple (2), and
said elastic device (7), which comprises one or more carriages (8), each of which slidably movable within said containment structure (10), is provided with one said corresponding head portion (9A, 9B) projecting from said containment structure (10) and provided with a corresponding said first hole (90A, 90B);
wherein said at least one spring (11) acts on said one or more carriages (8) in order to elastically force said one or more carriages (8) towards the interior of said containment structure (10).

7. The elastic hinge of claim 1, wherein said first articulation element (4) is mechanically associated with a temple (2) of the eyeglass frame, and said second articulation element (5) is mechanically associated with a front (3) of the eyeglass frame;
wherein said second articulation element (5) comprises:
said containment structure (10), which is intended to be fixed to the front (3) of the frame of said eyeglasses, and
said elastic device (7), which comprises at least one elastic pusher (8'), which is slidably movable within said containment structure (10), and acts, pushed by said at least one spring (11), against said at least one head portion (9A);
wherein said at least one spring (11) acts on said at least one elastic pusher (8') in order to elastically force it towards the exterior of said containment structure (10).

* * * * *